United States Patent

Hirahara et al.

[11] Patent Number: 5,740,039
[45] Date of Patent: Apr. 14, 1998

[54] VEHICLE WHEEL SUSPENSION ARRANGEMENTS

[75] Inventors: Michihito Hirahara; Takeshi Kimura; Hideo Tobata, all of Yokosuka, Japan

[73] Assignee: Nissan Motor Co., Ltd., Yokohama, Japan

[21] Appl. No.: 550,000

[22] Filed: Oct. 30, 1995

[30] Foreign Application Priority Data

Oct. 28, 1994 [JP] Japan ................................. 6-265525
Oct. 28, 1994 [JP] Japan ................................. 6-265526

[51] Int. Cl.$^6$ ................................................ B60G 17/015
[52] U.S. Cl. ................................. 364/424.046; 280/707
[58] Field of Search ...................... 364/424.046, 424.047; 280/707, 840

[56] References Cited

U.S. PATENT DOCUMENTS

| | | | |
|---|---|---|---|
| 4,938,499 | 7/1990 | Kawabata | 280/707 |
| 5,175,687 | 12/1992 | Tsutsumi et al. | 280/707 |
| 5,301,111 | 4/1994 | Utsui et al. | 364/424.046 |
| 5,303,155 | 4/1994 | Kallenbach et al. | 280/707 |
| 5,375,872 | 12/1994 | Ohtagaki et al. | 364/424.046 |
| 5,497,324 | 3/1996 | Henry et al. | 364/424.046 |

FOREIGN PATENT DOCUMENTS

| | | |
|---|---|---|
| 41 16 839 | 1/1992 | Germany. |
| 61-135811 | 6/1986 | Japan. |
| 61-166715 | 7/1986 | Japan. |
| 64-074111 | 3/1989 | Japan. |

*Primary Examiner*—Gary Chin
*Attorney, Agent, or Firm*—Foley & Lardner

[57] ABSTRACT

A wheel suspension arrangement for a wheel carrier including a suspension spring and a hydraulic actuator has a valve controlling the actuator. A stroke sensor detects the position of the wheel carrier relative to the vehicle body, and an acceleration sensor detects the vertical component of acceleration of the vehicle body adjacent the wheel and provide signals to a controller, which derives force components acting on the vehicle body by the suspension spring and actuator, respectively. The controller derives a modified combined force acting on the body out of the force components and determines a force counterbalancing the modified combined force, and controls the valve to cause the actuator to vary the force acting between the associated wheel carrier and the vehicle body by the force counterbalancing the modified combined force.

22 Claims, 21 Drawing Sheets

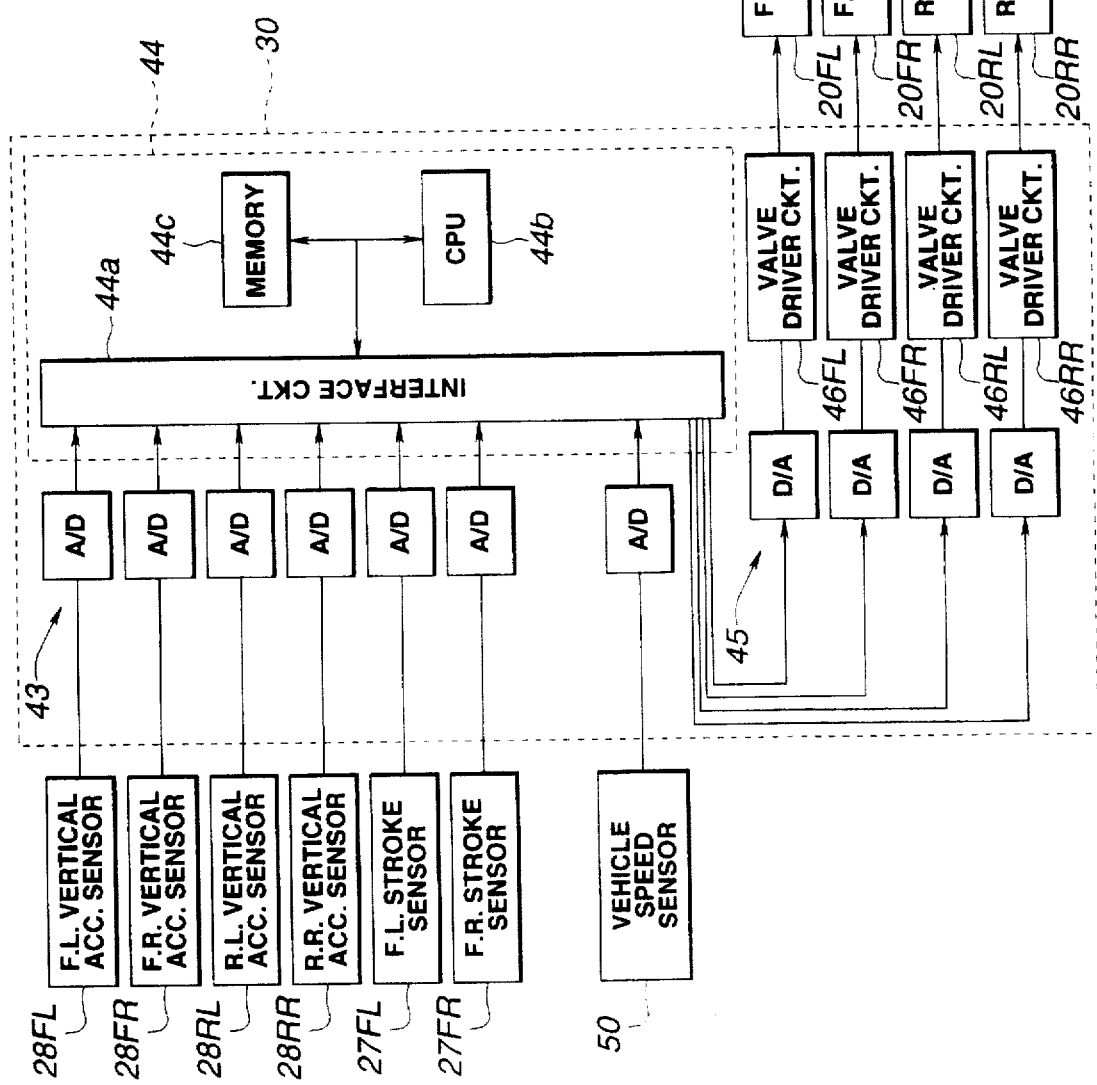

5,740,039

1

VEHICLE WHEEL SUSPENSION ARRANGEMENTS

BACKGROUND OF THE INVENTION

The present invention relates to vehicle wheel suspension arrangements.

In a known vehicle wheel suspension arrangement described in JP-A 61-135811, the road surface is scanned with an ultrasonic sensor, the output signals of which represent the road-surface undulations or irregularities. The output signals and an output signal of a vehicle speed are processed in a controller to control a valve of a hydraulic actuator between a wheel and the vehicle body such that the relative position of the wheel to the vehicle body varies in response to the detected road-surface irregularities.

In JP-A 61-166715, a vehicle wheel suspension arrangement is described in which a vertical acceration sensor is provided to measure and vertical component of acceleration acting on a front wheel and uses an output signal of the vertical acceleration sensor in controlling a suspension system for a rear wheel disposed on the same side of the vehicle.

An object of the present invention is to provide a vehicle wheel suspension arrangement employing the road-surface dependent control in such a way that force acting between a wheel carrier and the vehicle body is optimally adjusted for vibration in the range of body resonance as well as for vibration in the range of wheel carrier resonance under all conceivable driving conditions.

SUMMARY OF THE INVENTION

In accordance with the present invention, a wheel suspension arrangement for a vehicle having a vehicle body, comprises:

a wheel carrier movably mounted on the vehicle body;

a suspension spring acting between said wheel carrier and the vehicle body;

an actuator operable in response to a control signal to produce a body supporting force acting between the body and the wheel carrier; and a controller operable to develop the control signal, the controller being operable to derive a combined force acting on the body by the suspension spring and by the actuator in response to the vertical component of vibration of the wheel carrier, the controller being operable to modify the derived combined force and also operable to determine a force counterbalancing the modified derived combined force, the derived combined force being modified in such a manner as to insulate transmission of vibrations to the body in the range of body resonance as well as transmission of vibrations to the body in the range of wheel carrier resonance.

2

Figure 1:
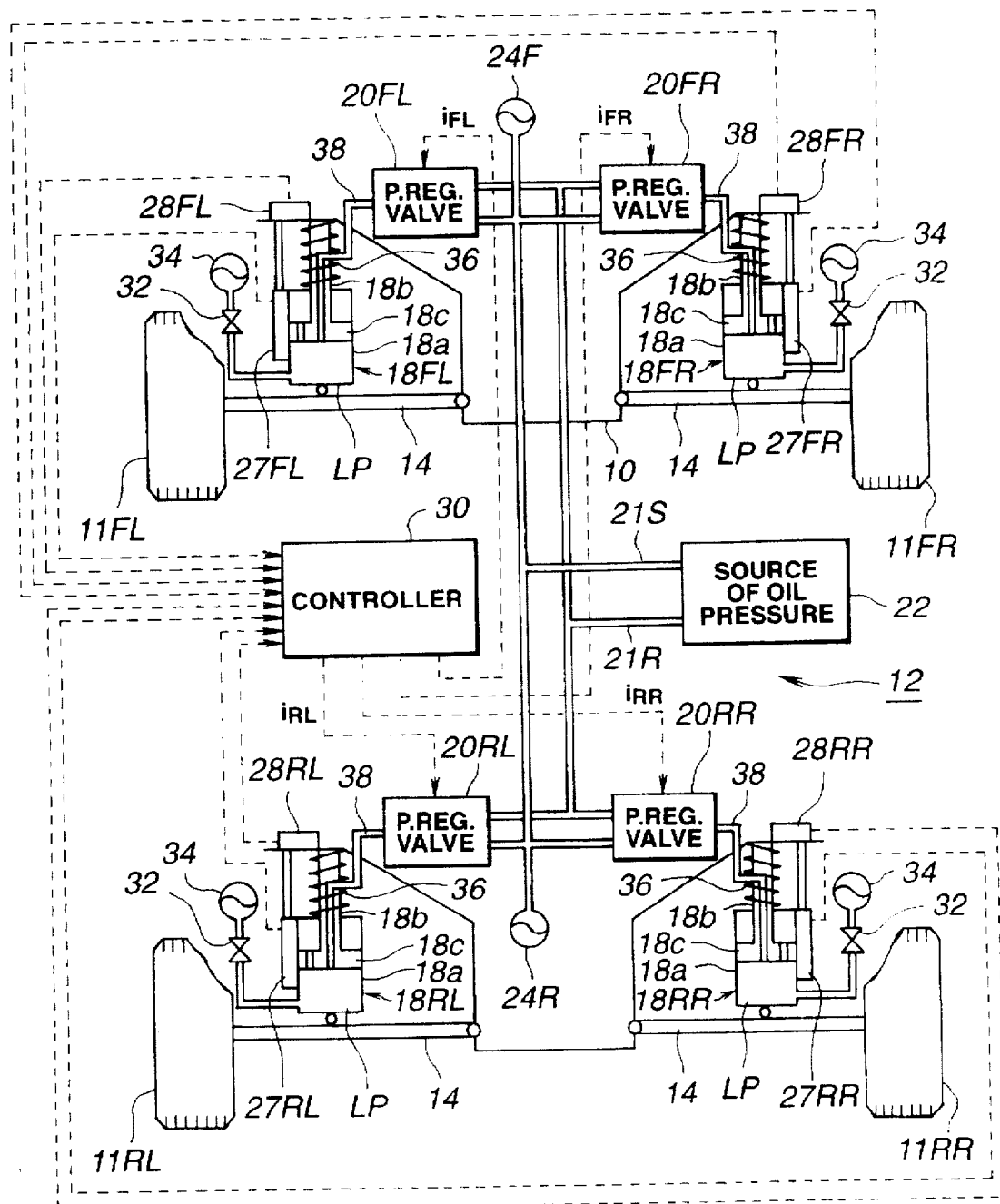
FIG. 1 shows, diagrammatically, a suspension arrangement for a vehicle.
Figure 5:
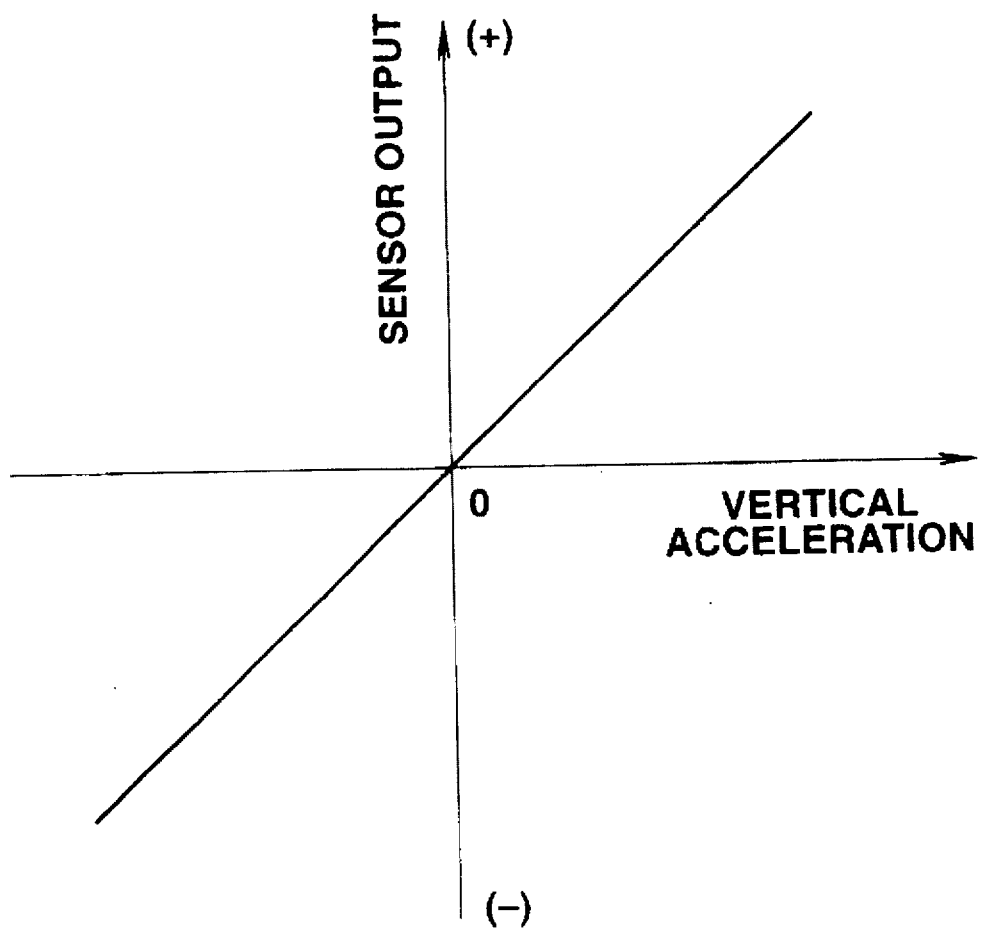
Figure 6:
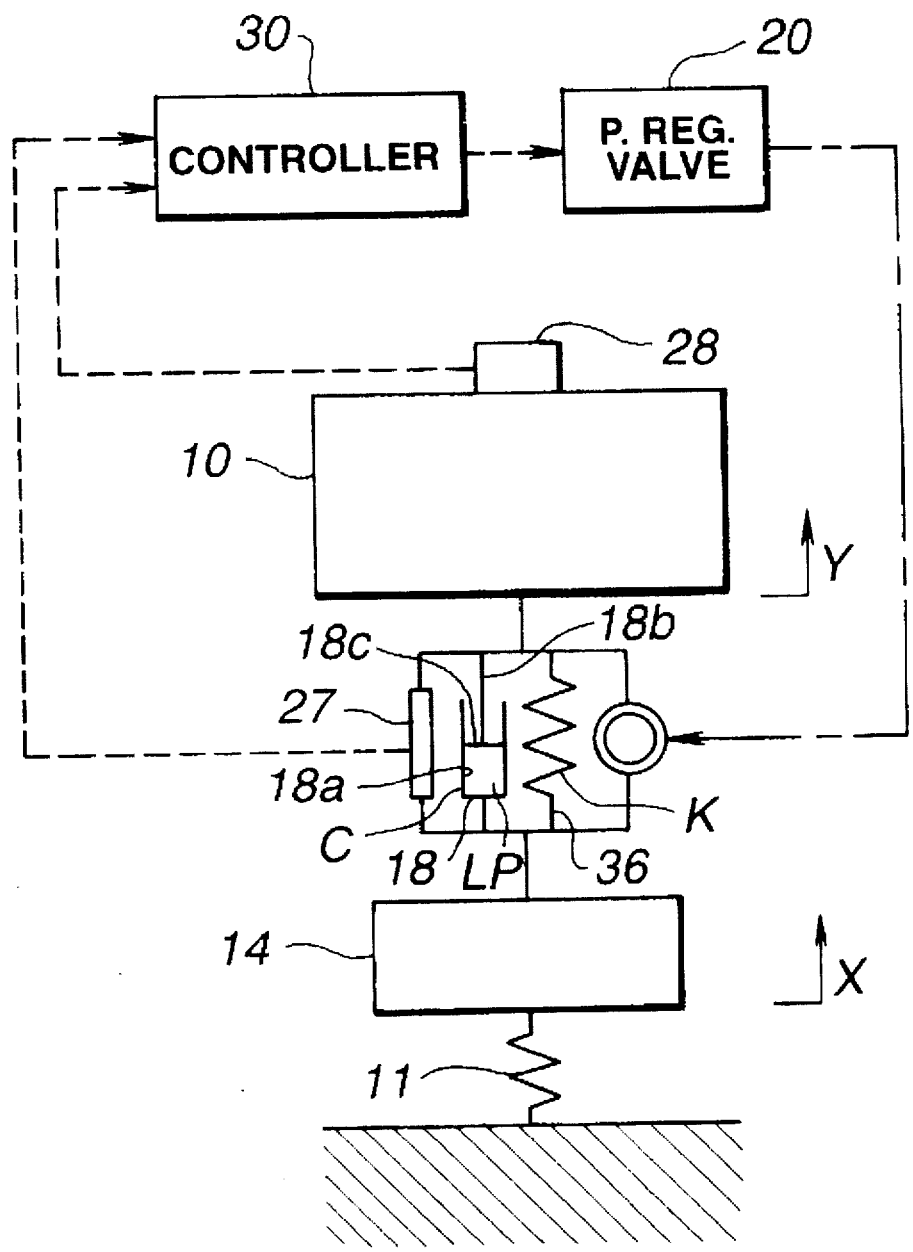
Figure 7:
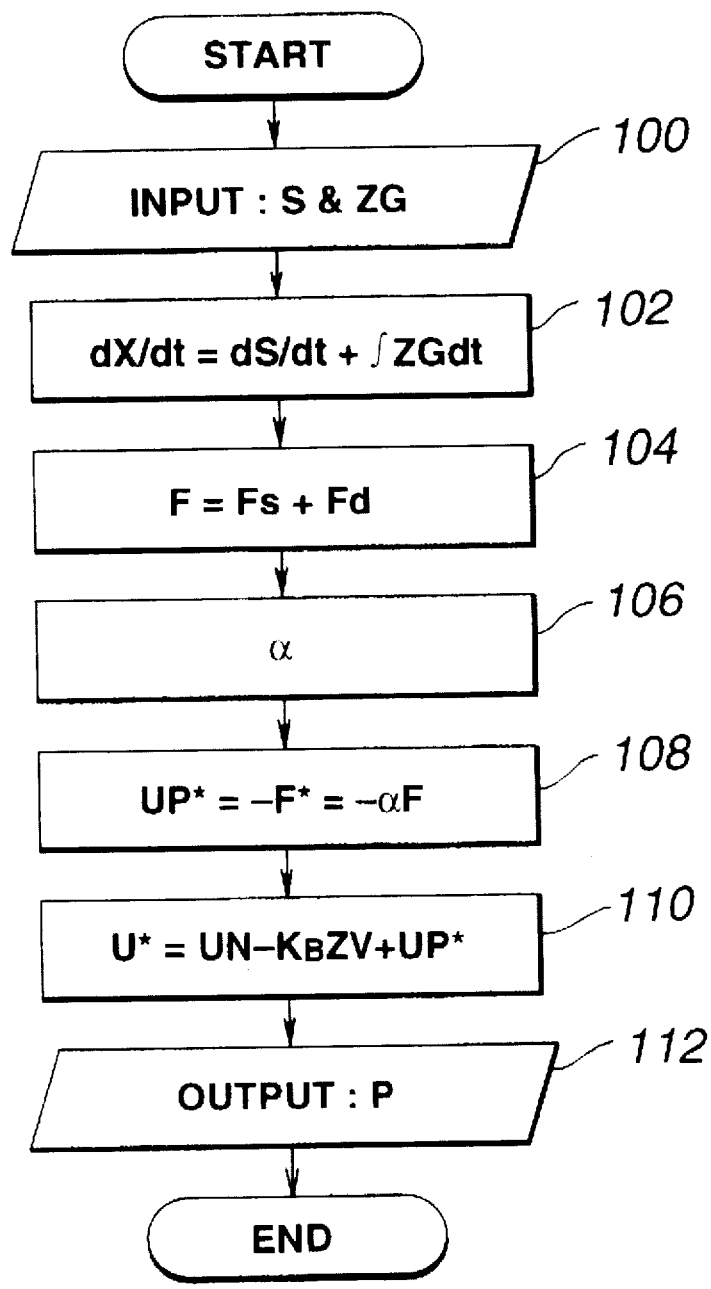
Figure 8:
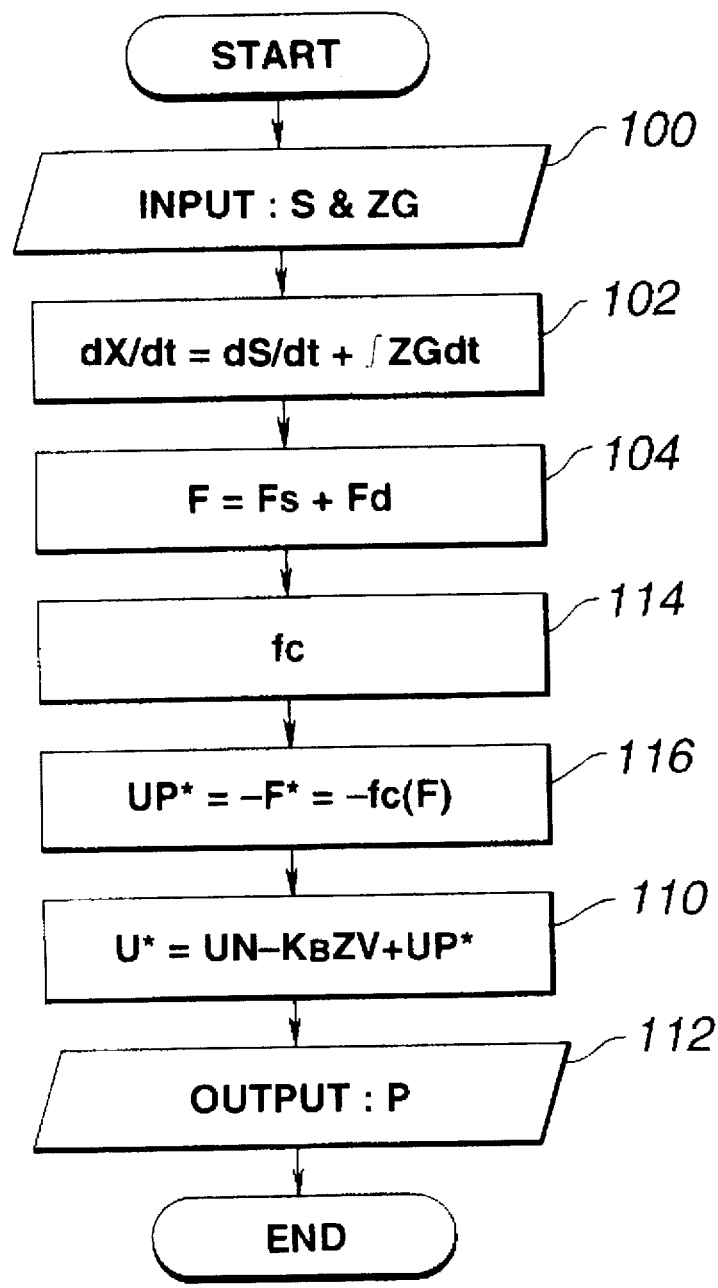
Figure 9:
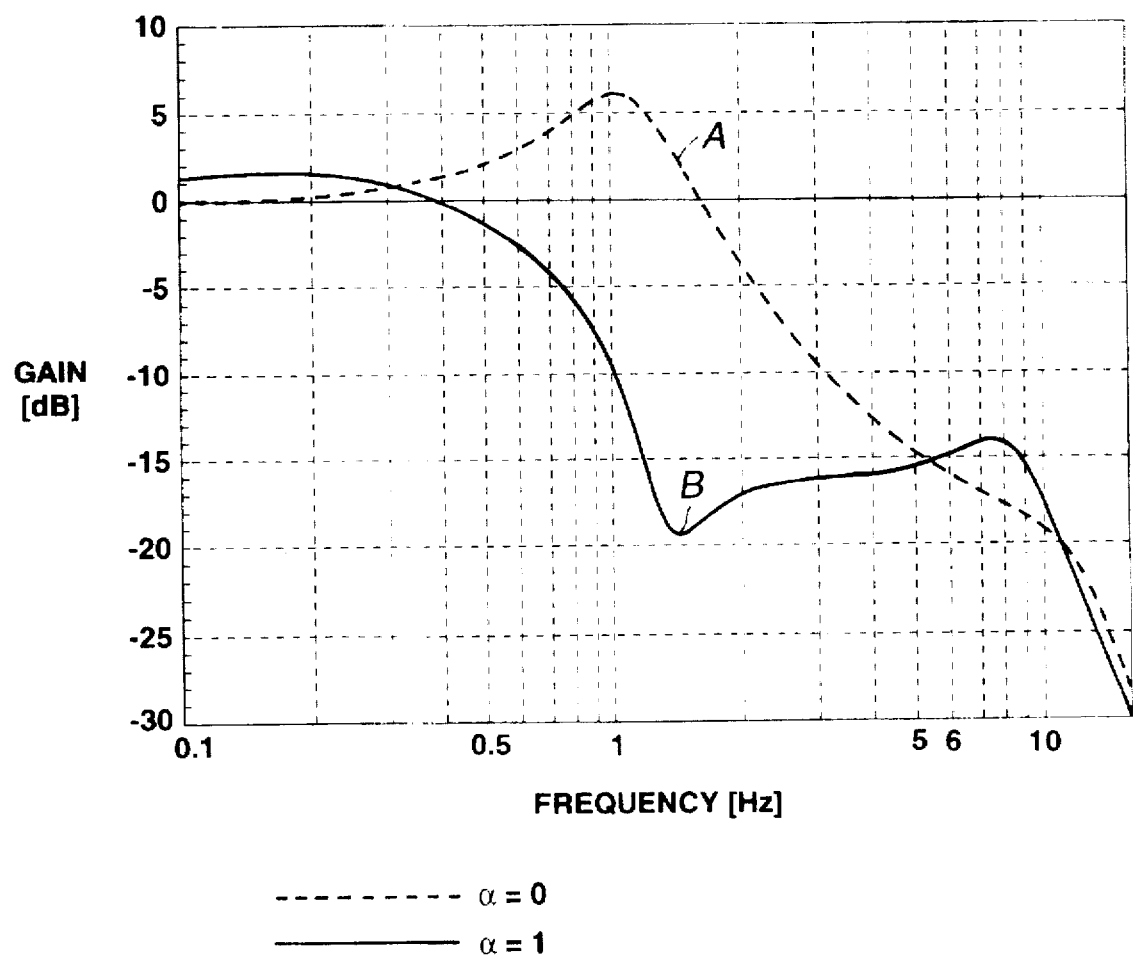
Figure 10:
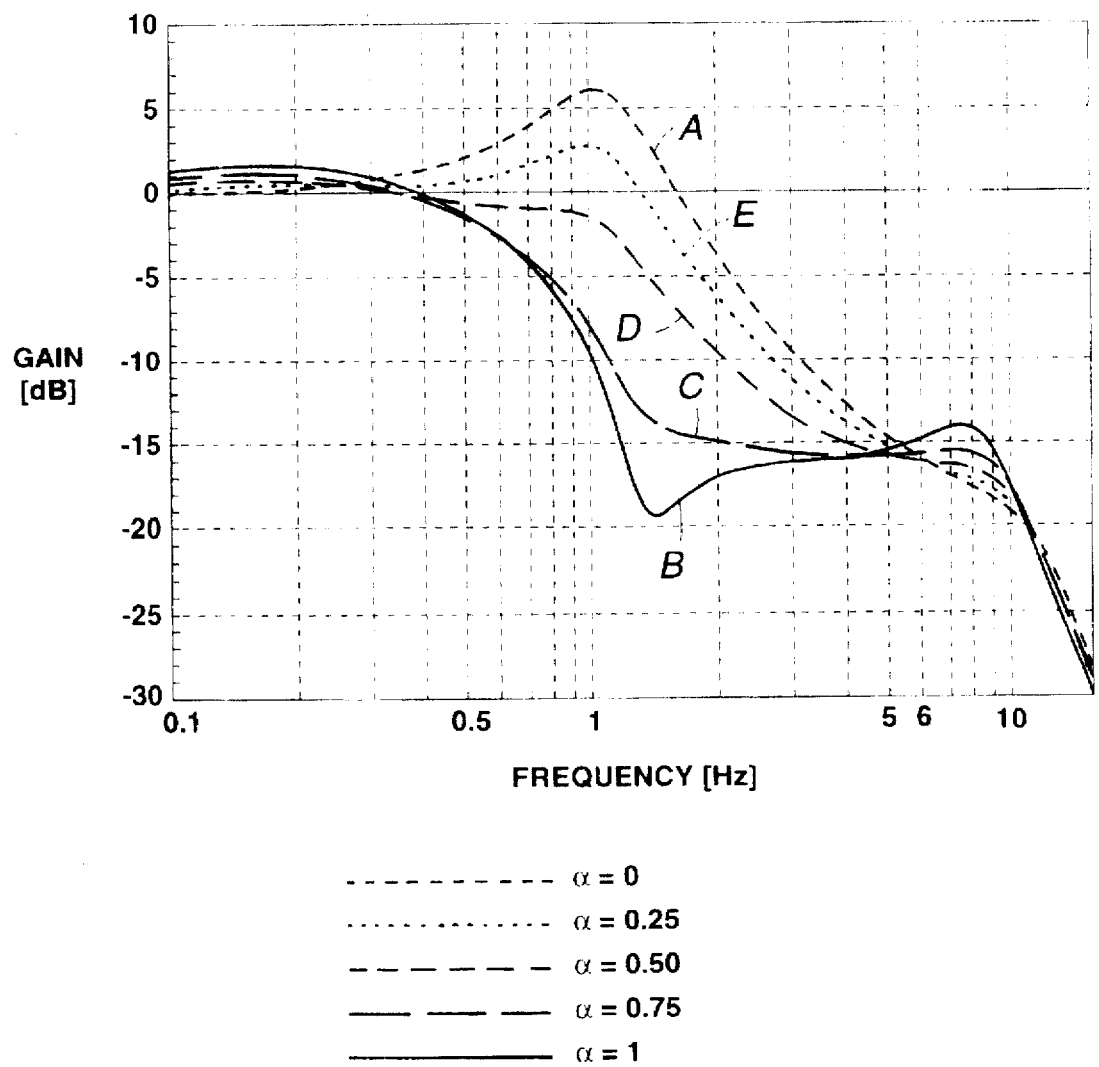
Figure 11:
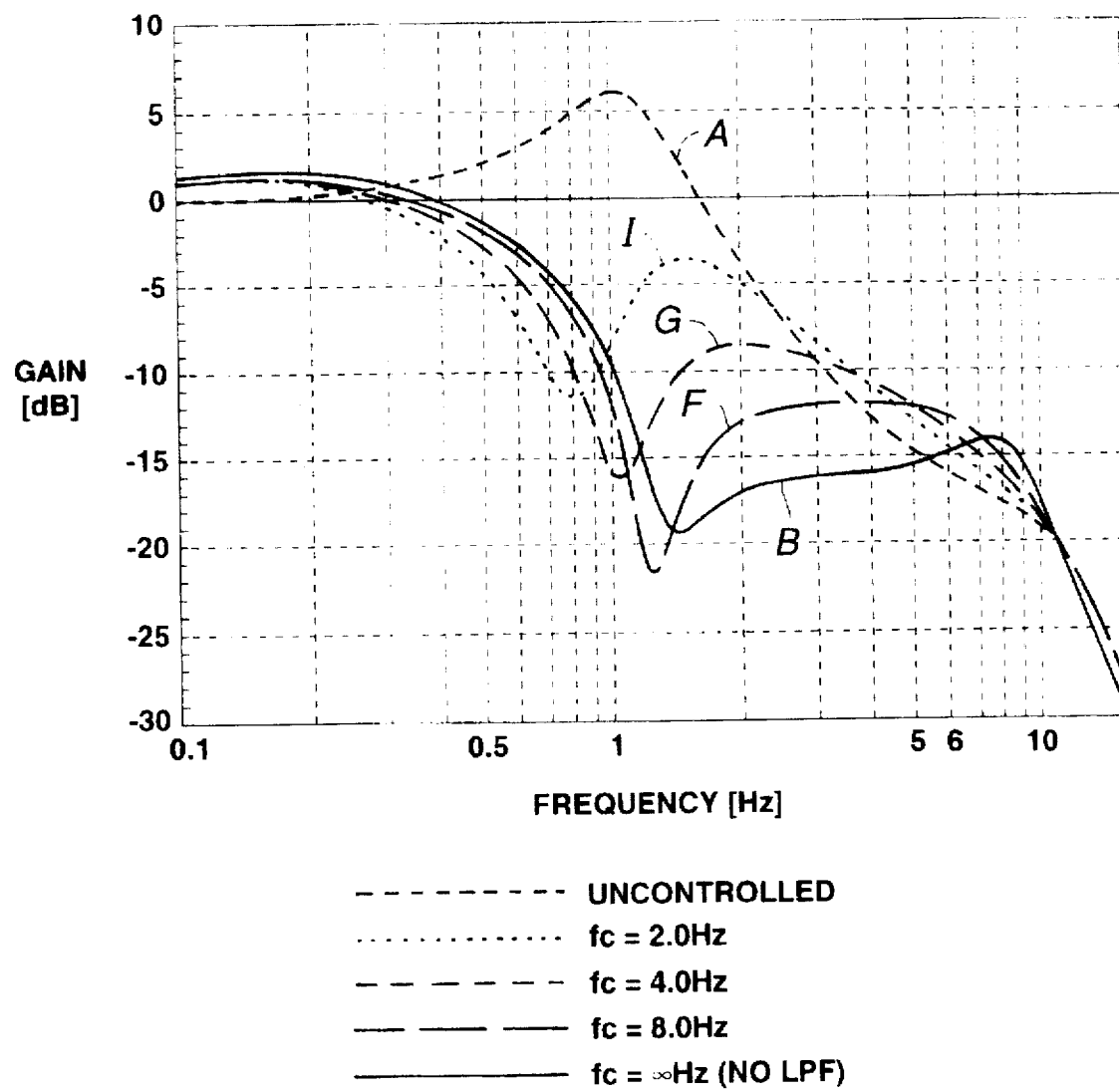
Figure 12:
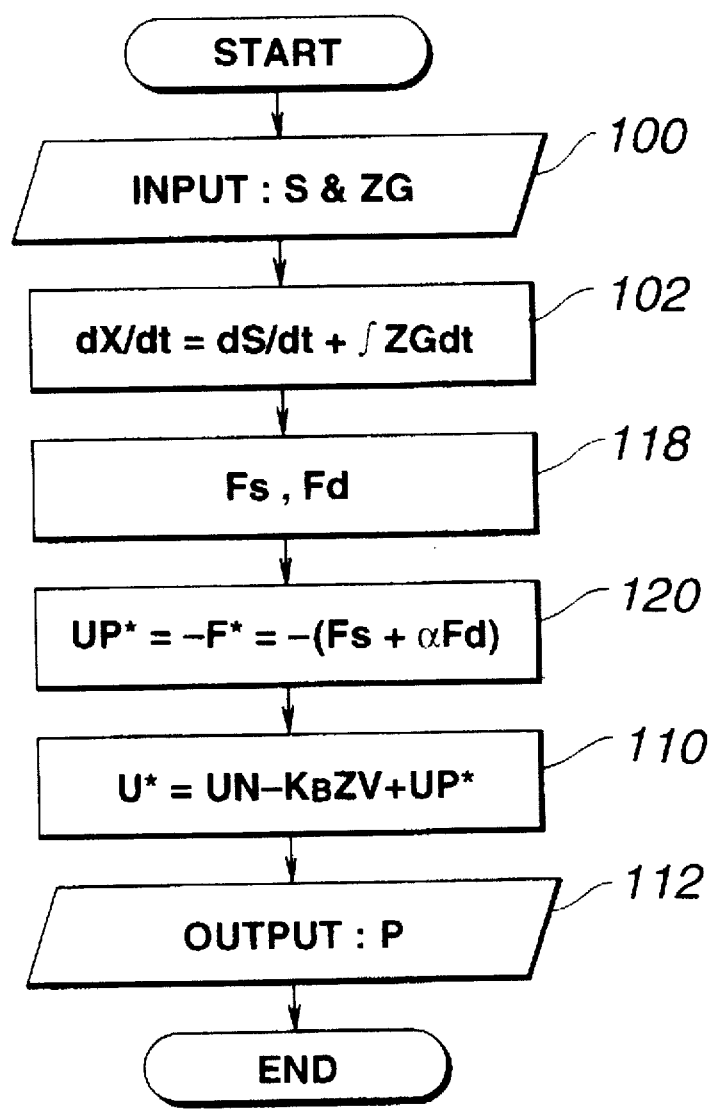
Figure 13:
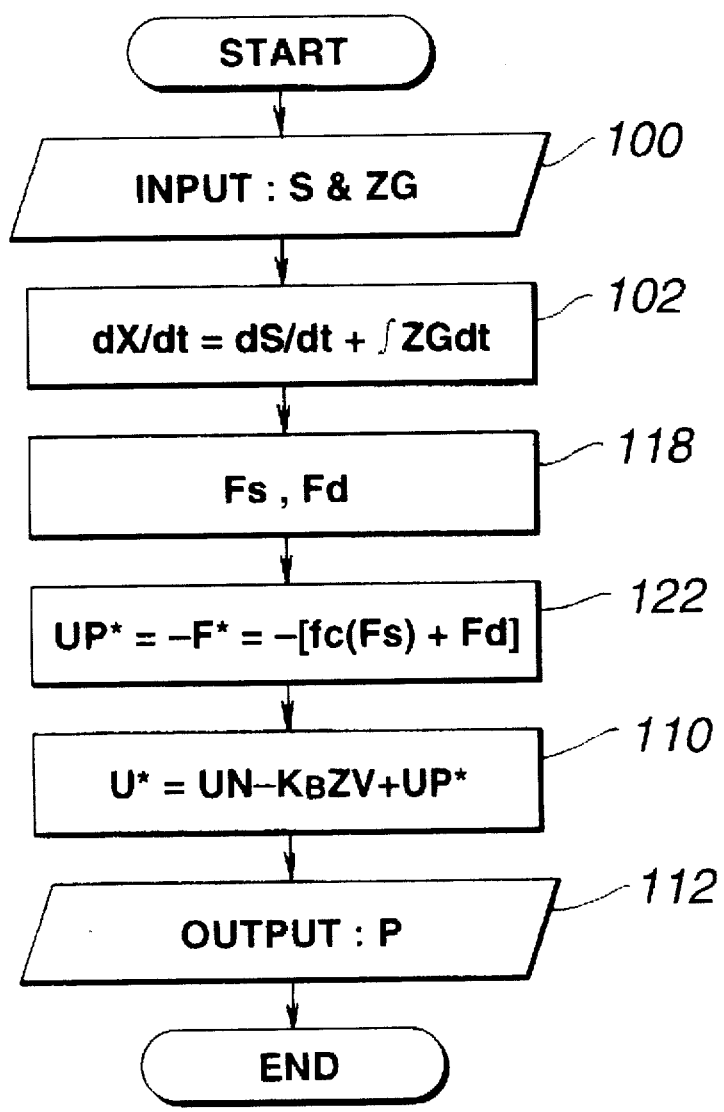
Figure 14:
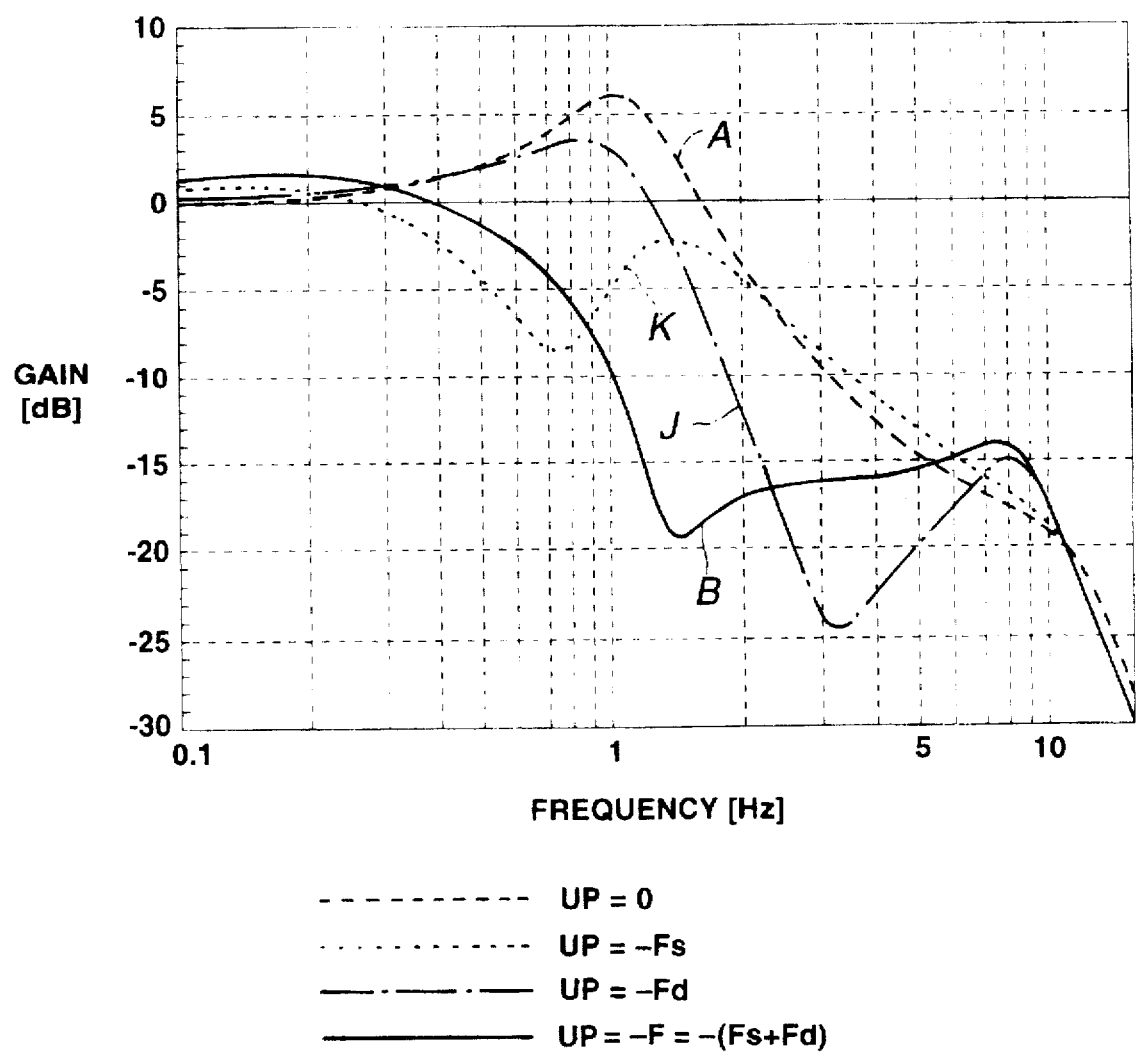
Figure 15:
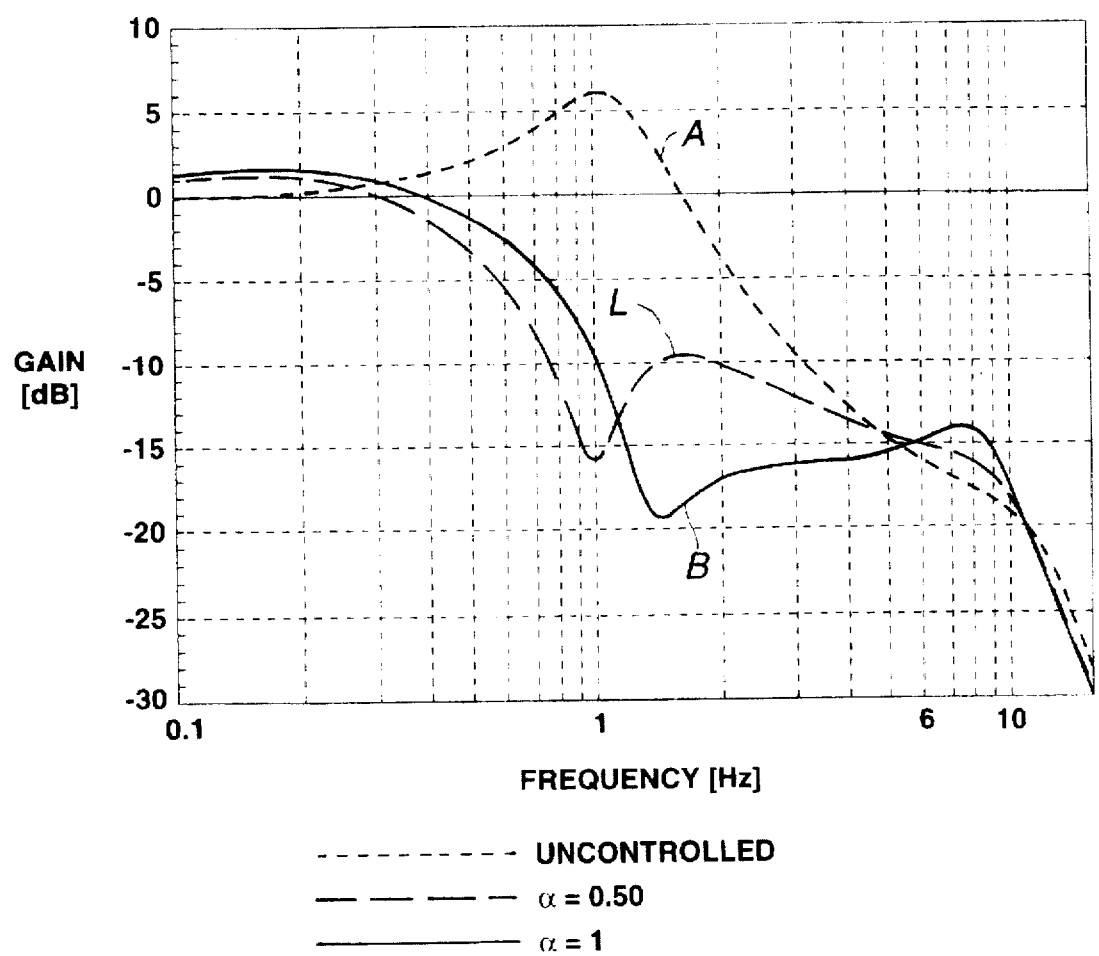
Figure 16:
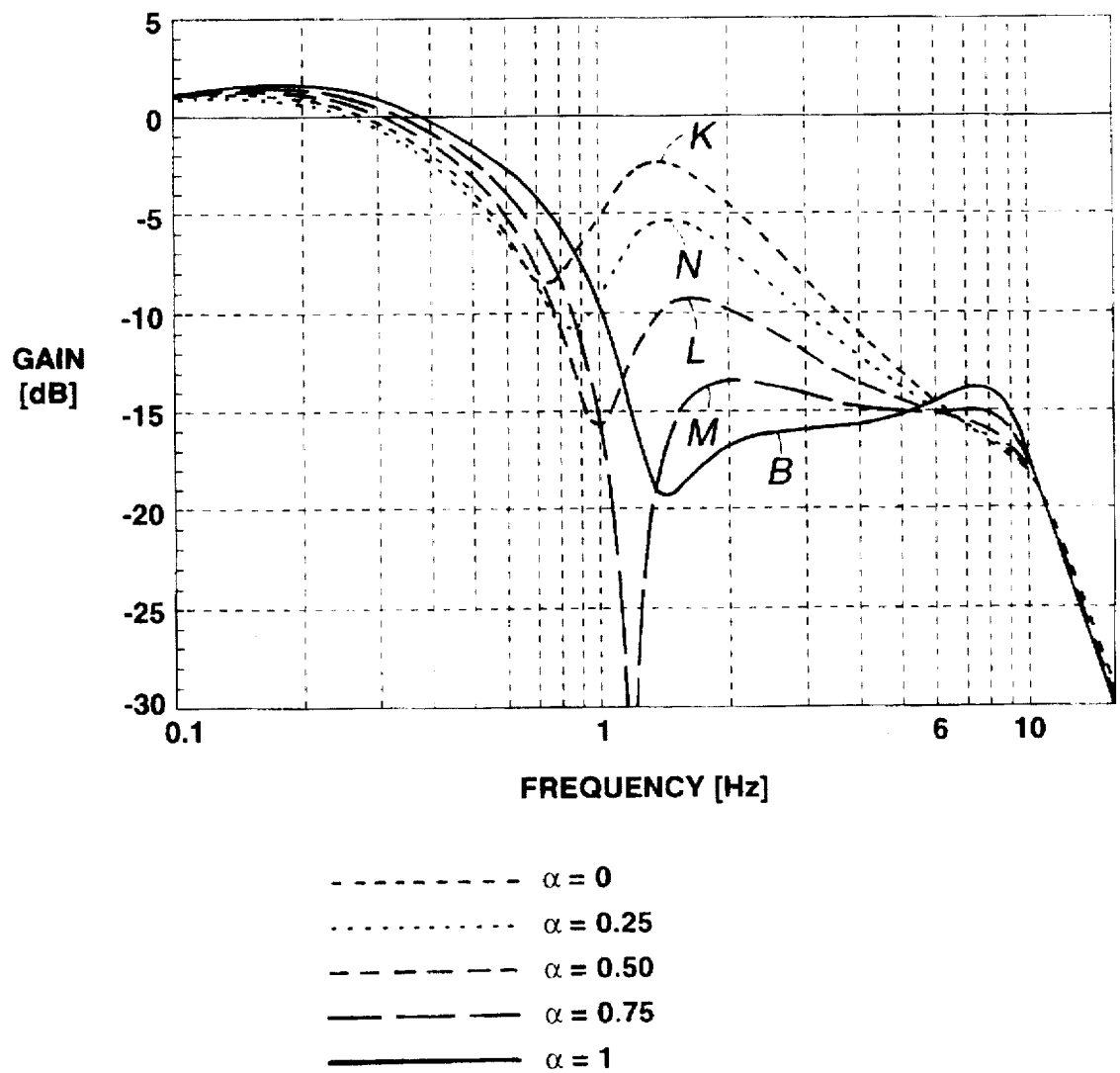
Figure 17:
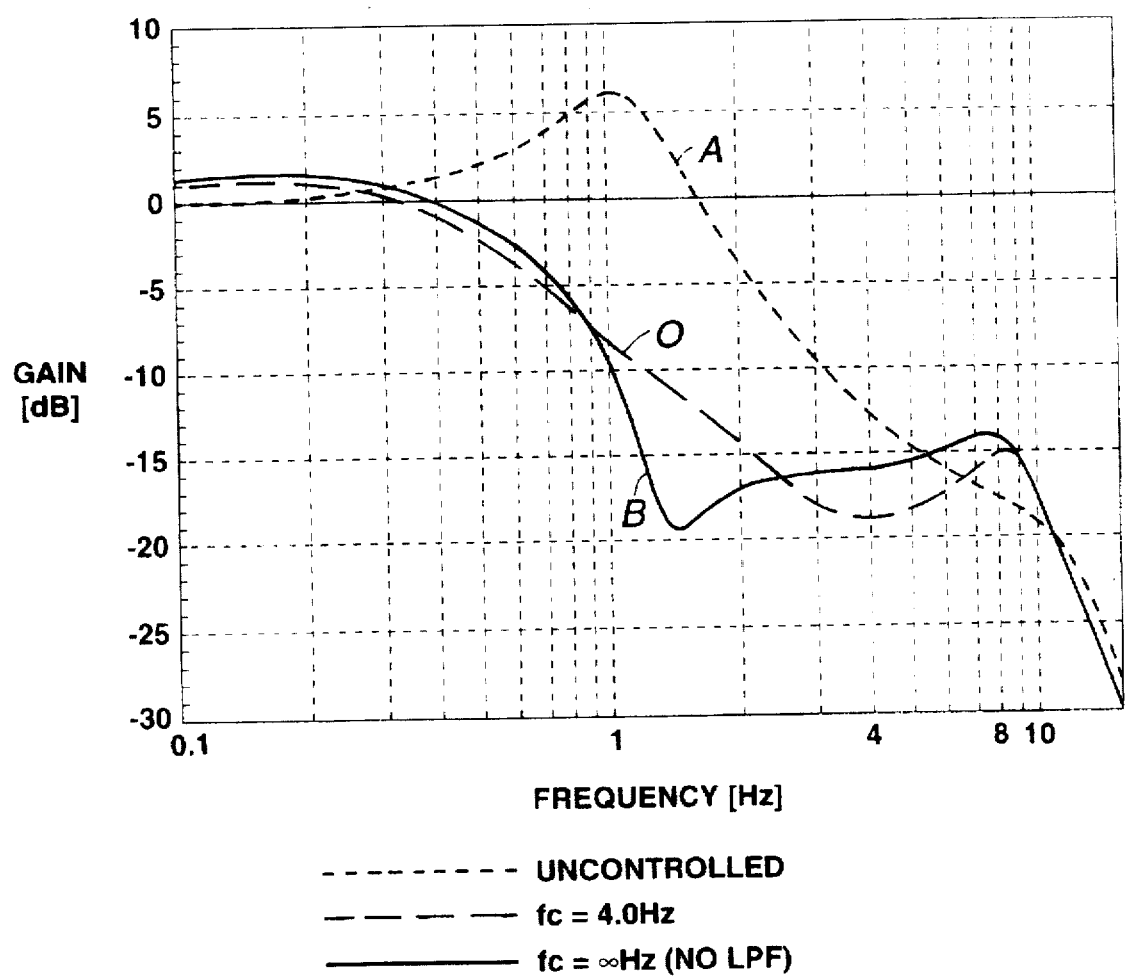
Figure 18:
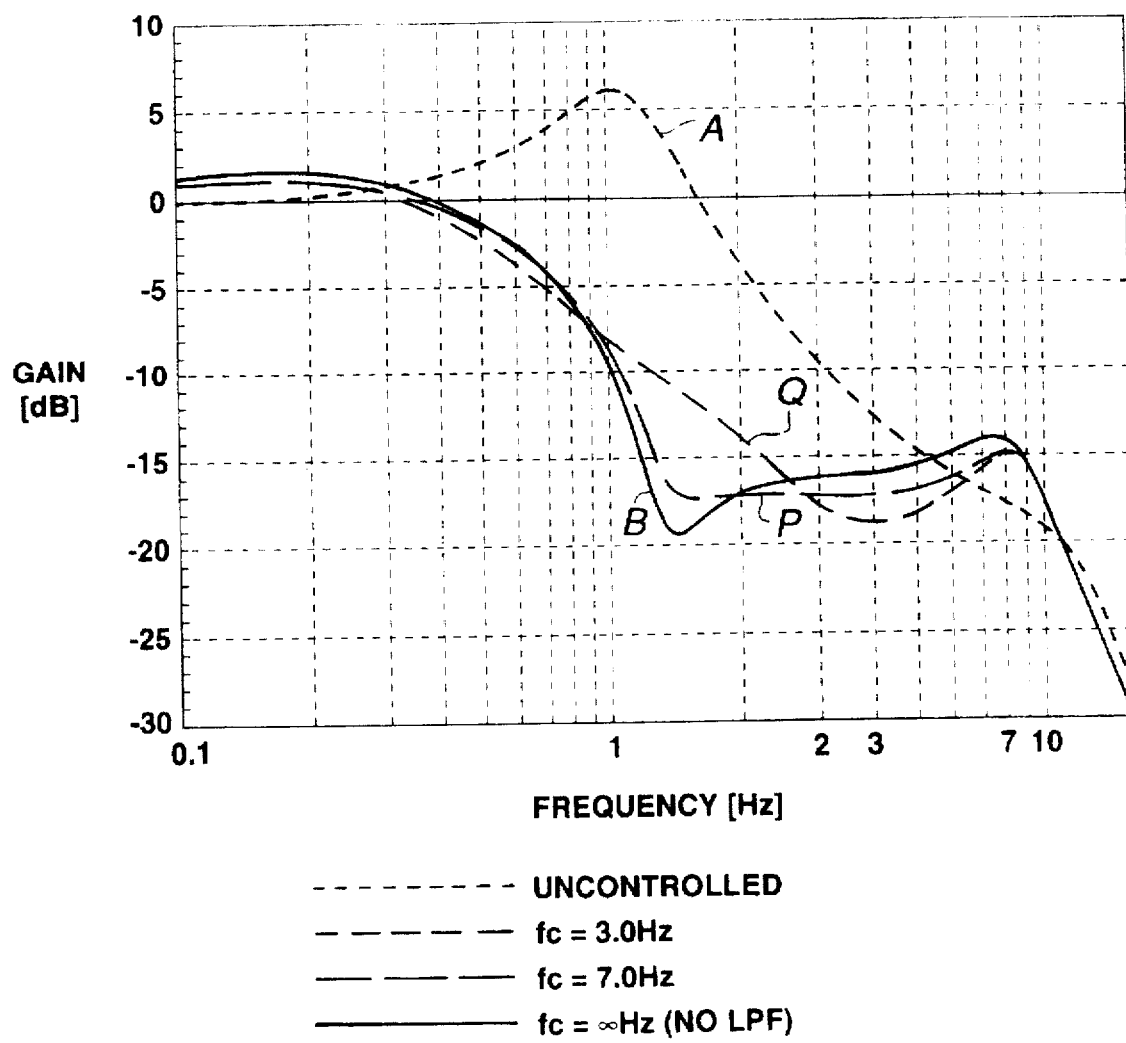
Figure 19:
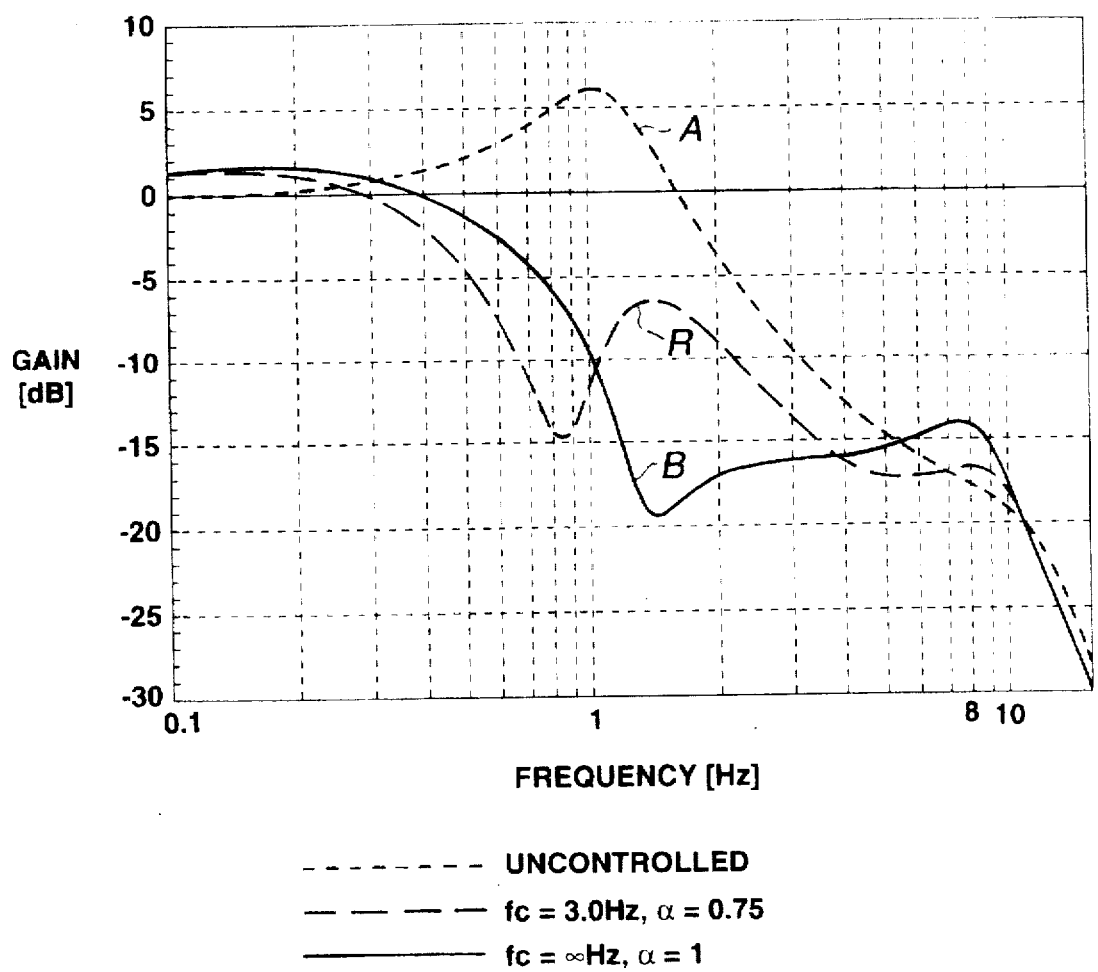
Figure 20:
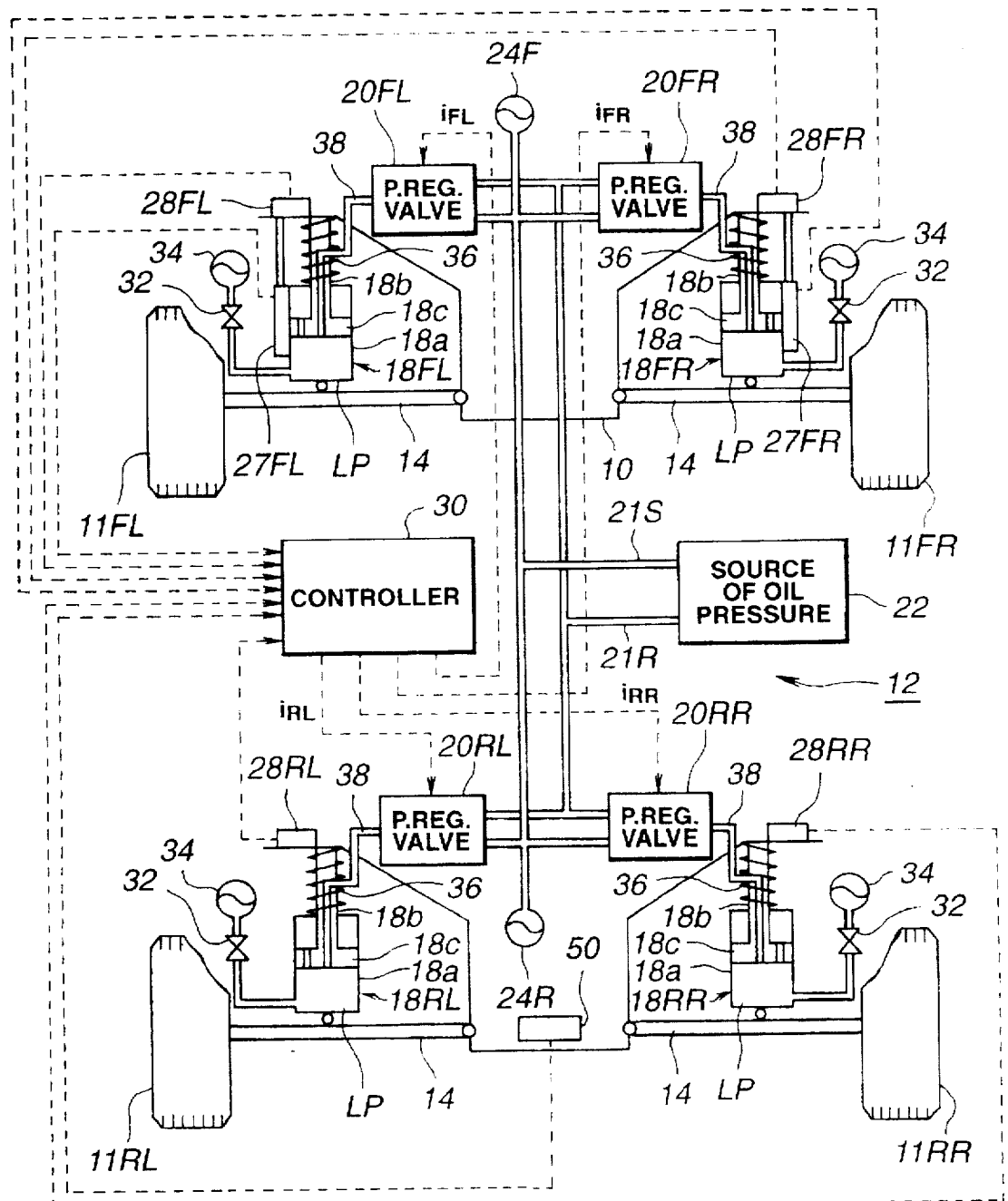
Figure 21:
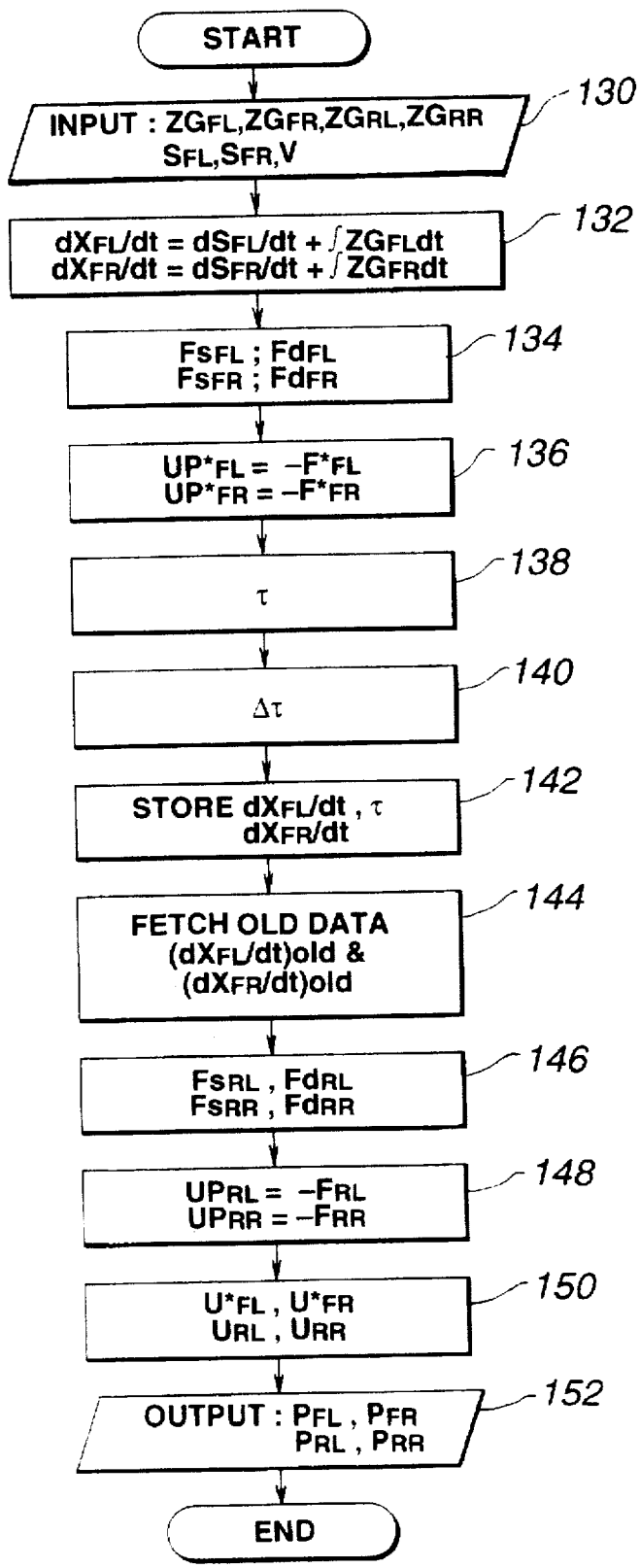

FIG. 5 is a graph of sensor output of each of vertical acceleration sensors of FIG. 1 arrangement against the vertical component of acceleration of the vehicle body adjacent the wheel;

FIG. 6 is a diagrammatic view of a single wheel suspension arrangement embodying the invention;

FIG. 7 is a flow chart of the control program for the control system according to a first embodiment of the invention;

FIG. 8 is a flow chart of the control program for the control system according to a second embodiment of the invention;

FIG. 9 shows two different gain vs. frequency plots for the suspension arrangement;

FIG. 10 shows three different gain vs. frequency plots for the suspension arrangement in addition to the two different plots of FIG. 9;

FIG. 11 shows another three different gain vs. frequency plots for the supension arrangement in addition to the two different plots of FIG. 9;

FIG. 12 is a flow chart of the control program for the control system according to a third embodiment of the invention;

FIG. 13 is a flow chart of the control program for the control system according to a fourth embodiment of the invention;

FIG. 14 shows filled another two different gain vs. frequency plots for the suspension arrangement in addition to the two different plots of FIG. 9;

FIG. 15 shows a gain vs. frequency plot in addition to the two different plots of FIG. 9;

FIG. 16 shows further two different gain vs. frequency plots in addition to two of the three different plots of FIG. 15;

FIG. 17 shows a gain vs. frequency plot in addition to the two different plots of FIG. 9;

FIG. 18 shows further two gain vs. frequency plots in addition to the two different plots of FIG. 9;

FIG. 19 shows a gain vs. frequency plot in addition to the two different plots of FIG. 9;

FIG. 20 shows a modified suspension arrangement for a vehicle according to a fifth embodiment of the invention;

FIG. 21 is a flow chart of the control program for the control system of the fifth embodiment; and FIG. 22 is a block diagram of a control system for the suspension arrangement of FIG. 20.

DETAILED DESCRIPTION OF THE INVENTION

Referring to FIG. 6, a single wheel suspension arrangement is schematically represented using a two mass system. The single wheel suspension arrangement of FIG. 6 includes a wheel 11, a wheel carrier 14 as an unsprung mass, and a vehicle body 10 as a sprung mass. The wheel carrier 14 is mounted to the vehicle body 10 to permit the body 10 to rise and fall relative to the wheel 11. A suspension spring 36 having a spring constant K acts between the body 10 and the carrier 14, which are also connected by a hydraulic actuator including a hydraulic damper 18. The hydraulic actuator 18 has a damping resistance or coefficient C and includes a cylinder tube 18a, a piston rod 18b and a piston 18c formed with a throttle passage, which allows the flow of oil between both chambers across the piston 18c. The piston 18c is disposed in the cylinder tube 18a for reciprocal motion. The piston rod 18b extends upwardly from an upper end face of the piston 18c. The piston 18c has a lower end face defining a lower pressure chamber LP. This chamber LP communicates with an accumulator via a throttle valve in a manner as illustrated in FIG. 1 that is later described.

Figure 3:
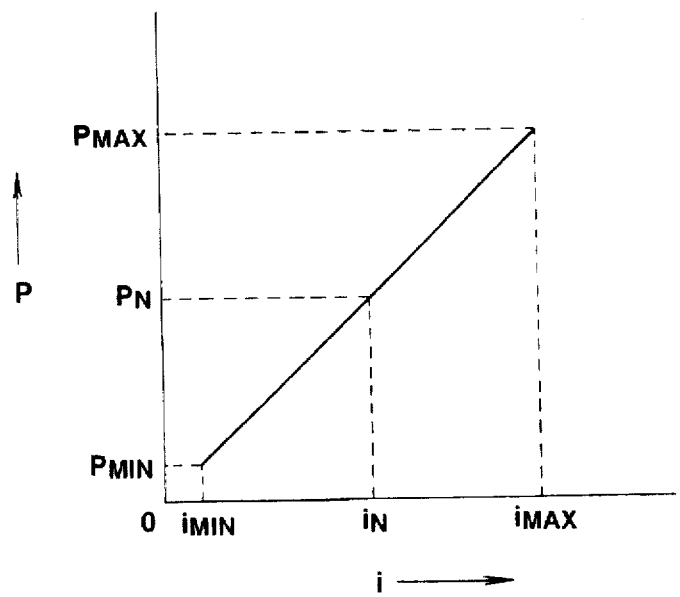
FIG. 3 is a graph of hydraulic pressure output of each of pressure regulator valves of FIG. 1 arrangement against electric current input.

A pressure regulator valve 20 is provided for reglating supply of oil to the pressure chamber LP and discharge of oil therefrom in response to an electric current supplied thereto. The pressure regulator valve 20 is an electromagnetic pressure reduction valve having three ports and a proportioanl type solenoid. Such an electromagnetic valve is disclosed in JP-A 64-74111, which corresponds to U.S. Pat. No. 4,938,499, issued on Jul. 3, 1990. This United State Patent has been incoporated herein by reference in its entirety. In brief, the electromagnetic valve 20 has a valve housing formed with three ports, namely, an inlet port, an outlet port and a drain port, opening to the valve housing bore in which a spool is slidably received. A proportional type solenoid is provided for controlling the position of the spool. The position of the spool is determined in response to a command current i passing through a coil of the proportional type solenoid. The inlet port of the valve 20 is connected to a source of oil pressure and the outlet port thereof is connected to the pressure chamber LP. FIG. 3 shows the pressure P at the outlet port against the command current i. Taking the noise into account, the minimum current $i_{MIN}$ is determined. The pressure P takes the lowest value $P_{MIN}$ for the minimum current $i_{MIN}$, and increases proportionally as the current i increases. At the maximum current $i_{MAX}$, the pressure P takes the maximum value $P_{MAX}$ as high as the pressure within the source of oil pressure. In FIG. 3, the denotations $i_N$ and $P_N$ represent neutral current and neutral pressure, respectively.

The hydraulic actuator 18 generates a body supporting force which is determined in response to the pressure P within the cylinder tube 18a and a difference between pressure acting area on the upper end face of the piston 18c and pressure acting area on the lower end face thereof. This force acts between the body 10 and the wheel carrier 14 to support the vehicle body 10.

Figure 4:
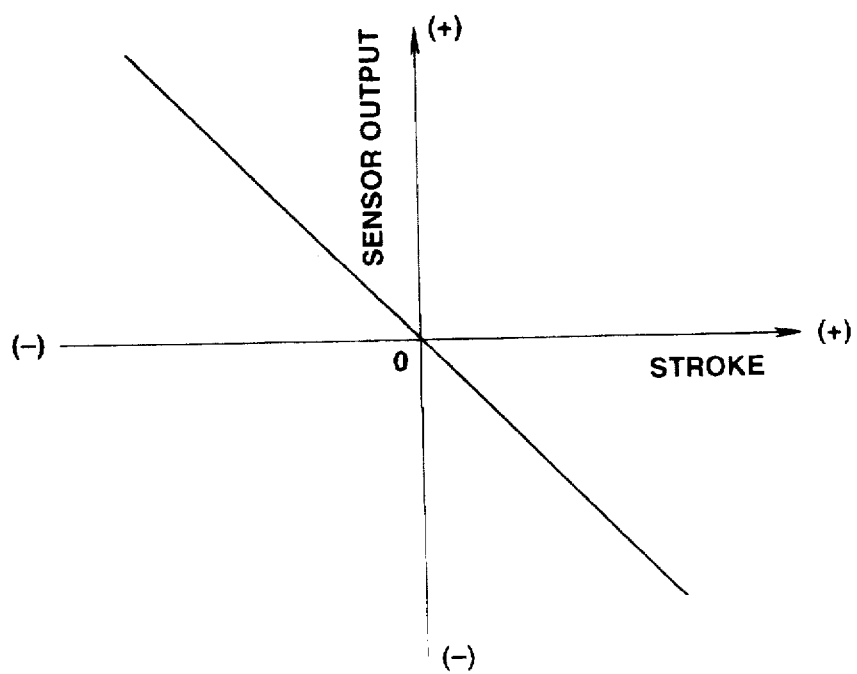
FIG. 4 is a graph of sensor output of each of stroke sensors of FIG. 1 arrangement against the position of the wheel carrier relative to the vehicle body (stroke)

A stroke sensor 27 is provided for producing, as a sensor output S, an electric signal corresponding to the stroke of the piston 18c. This electric signal corresponds to the position of the wheel carrier 14 relative to the vehicle body 10. FIG. 4 shows the sensor output of the stroke sensor 27 against stroke of the piston 18a. The setting of the hydraulic actuator 18 is such that when the pressure P is held at the neutral pressure $P_{IN}$, the piston 18c takes the neutral position thereof to hold the vehicle body 10 at a target level of height. The stroke sensor 27 produces a zero voltage when the piston 18c takes the neutral position thereof to hold the vehicle body 10 at the target level of height. As the vehicle body 10 rises above the target level of height, the stroke sensor 27 produces a negative voltage signal, while as the body 10 falls below the target level of height, the stroke sensor 27 produces a positive voltage signal. The sign of the electric signal produced by the stroke sensor 29 represents the direction of deviation of the height of the vehicle body 10 from the target level of height, and the magnitude of this electric signal corresponds to the amount of such deviation.

A vertical acceleration sensor 28 is provided on the vehicle body 10 adjacent the wheel position for producing, as a sensor output ZG, an electric signal corresponding to the vertical component of acceleration. Referring to FIG. 5, the vertical acceleration sensor 28 produces a zero voltage when the vertical component of acceleration is zero. When the vehicle body 10 is subject to the vertical upward acceleration, the vertical acceleration sensor 28 produces a positive electric signal the magnitude of which corresponds to the magnitude of the vertical component of acceleration. When the vehicle body 10 is subject to the vertical downward acceleration, the vertical acceleration sensor 28 produces a negative electric signal the magnitude of which corresponds to the magnitude of the vertical component of acceleration.

The sensor outputs S and ZG are fed to a controller 30, which controls the command current i supplied to the pressure regulator valve 20.

In the arrangement of FIG. 6, the vertical displacement of the wheel carrier 14 from a reference level as high as the wheel axis level above the road surface is X and the vertical displacement of the vehicle body 10 form the target level of height is Y.

Using X and Y, the sensor output S of the stroke sensor 27 can be expressed as:

$$S = X - Y \qquad (1).$$

Differentiation of the both sides of the equation (1) over time gives the following result:

$$dS/dt = dX/dt - dY/dt \qquad (2).$$

Integration of the sensor output ZG (body acceleration) of the vertical acceleration sensor 28 is the body vertical velocity ZV which is considered to be equal to dY/dt. This can be expressed as follows:

$$dY/dt = zv = \int ZG\,dt \qquad (3).$$

Putting the equation (3) into the equation (2) and solving for dX/dt, the following result is obtained for the unsprung vertical velocity or the road surface irregularities:

$$dX/dt = dS/dt + \int ZG\,dt \qquad (4).$$

The displacement X can be determined by the integral of the unsprung mass vertical velocity dX/dt over time, as follows:

$$X = \int (dX/dt)\,dt \qquad (5).$$

Combined force F acting on the body 10 can be expressed as a sum of a first force component Fs generated by the spring 36 in response to road surface irregularities and a second force component Fd generated by the hydraulic actuator 18 is response to road surface irregularities. The first and second force components Fs and Fd can be expressed as follows:

$$Fs = KX \qquad (6).$$

$$Fd = C(dX/dt) \qquad (7).$$

where:

K is the spring constant,

C is the damping coefficient.

Force UP counterbalancing the combined force F can be expressed as follows:

$$UP = -F \qquad (8).$$

If force UN is required to act between the body 10 and the wheel carrier 14 to hold the body 10 as high as the target level of height in static state, body supporting force U required to deal with the road surface irregularities can be expressed as follows:

$$U = UN - K_B ZV + UP \quad (9)$$

where:

$K_B$ is the bounce coefficient.

In the suspension arrangement of FIG. 6, the controller 30 performs an arithmetic operation to determine the force U. Then, the controller 30 determines demand current i for the determined force U by, for example, performing a table look-up operation of FIG. 3 after converting the determined force to hydraulic pressure P. In response to the demand current i, the pressure regulator valve 20 adjusts hydraulic pressure within the pressure chamber LP to cause the hydraulic actuator 18 to generator the force U.

In order to confirm the effect of the third term UP of the equation (9), gain vs. frequency plots A and B are formed in FIG. 9. The plot A represents vibrations if the third term UP is eliminated from the equation (9), while the plot B represents vibrations if the third term UP is left as it is in the equation (9).

Comparing the lot B with the plot A reveals that insulation of the vehicle body 10 is improved for vibrations in the range of body resonance (1–2 Hz) at the expense of worse insulation of the body 10 for vibrations in the range of wheel carrier resonance (above 5 to 6 Hz).

Owing to arithmetic operation delay and hydraulic delay, the third term UP of the equation (9) provides a worse result in the case of vibrations in the range of wheel carrier resonance.

The present invention modifies force F to provide modified combined force F* and determines force UP* counterbalancing the modified combined force F*. Force UP* can be expressed as follows:

$$UP^* = -F^* \quad (10).$$

Using UP*, body supporting force U* required to deal with the road surface irregularities can be expressed as:

$$U^* = UN - K_B ZV + UP^* \quad (11)$$

where:

ZV is the integral of ZG over time.

The modified combined force F* can be expressed as:

$$F^* = \alpha F \quad (12)$$

where:

α(alpha) is a control gain.

Gain vs. frequency plots C, D and E are formed in FIG. 10 in addition to the two representative plots A and B. The plot C represents vibrations if the control gain α(alpha) is 0.75, the plot D represents vibrations if the control gain α(alpha) is 0.50, and the plot D represents vibrations if the control gain α(alpha) is 0.25.

As is readily seen from these plots, C, D and E, insulation of the vehicle body 10 becomes worse for vibrations in the range of body resonance (1–2 Hz) as the control gain α(alpha) becomes smaller, while insulation of the vehicle body 10 for vibrations in the range of wheel carrier resonance (above 5 or 6 Hz) becomes better. As the control gain α(alpha) becomes greater, insulation of the vehicle body 10 becomes better for vibrations in the range of body resonance, while insulation of the vehicle body 10 becomes worse for vibrations in the range of wheel carrier resonance.

Thus, the present invention proposes decreasing the control gain α(alpha) when vibrations in the range of wheel carrier resonance become predominant. In this case, ill effect of vibrations in the range of body resonance is increased owing to decreased control gain. But, since the vibrations in the range of body resonance are not predominant, vibrations of the vehicle body 10 can be held at a low level.

Also proposed is to increase the control gain α(alpha) when vibrations in the range of body resonance become predominant. In this case, ill effect of vibrations in the range of wheel carrier resonance is increased owing to increased control gain. But, since the vibrations in the range of wheel carrier resonance are not predominant, vibrations of the vehicle body 10 can be held at a low level.

In the first embodiment of the present invention, the control gain α(alpha) takes two values a1 and a2, with value a2 being not less than the value a1. These values a1 and a2 are not less than 0 (zero) and not greater than 1 (one). When vibrations in the range of body resonance are predominant, the control gain α(alpha) is set equal to a2, while when vibrations in the range of wheel carrier resonance are predominant, the control gain α(alpha) is set equal to a1. The value a1 is, for example, 0.2, and the value a2, is for example, 0.7.

In order to determine the control gain α(alpha), the controller 30 provides spectral density or power spectrum of signals ZG of the vertical acceleration sensor 28. Then, the controller 30 computes the amplitute of peak level in the range of 0.5 to 5 Hz (in the range of body resonance), weights the computed result and sets the weighted result as Plow. The controller 30 computes the amplitude of peak level in the range of 6 to 10 Hz (in the range of wheel carrier resonance), weights the computed result and sets the weighted result as Phigh. The computed result for the range of 6 to 10 Hz is more heavily weighted as compared to the computed result for the range of 0.5 to 5 Hz taking due consideration of human sensitivity.

The controller 30 compares Plow with Phigh and sets the control gain α(alpha) equal to a1 (=0.2) of a2 (=0.7) in response to the result of comparison. If Plow is greater than Phigh, the control gain α(alpha) is set equal to a2 (=0.7). If Phigh is greater than Plow, the control gain α(alpha) is set equal to a1 (=0.2).

The flow chart of FIG. 7 illustrative a control routine of a preferred implementation of the first embodiment according to the present invention. The controller 30 executes the control program illustrated in FIG. 7 at regular intervals Ts, for example, a sampling time of 20 ms.

At input box 100, the controller 30 inputs information of stroke S from the stroke sensor 27 and information of vertical body acceleration ZG from the vertical acceleration sensor 28.

In box 102, the controller 30 computes integration of the vertical body acceleration ZG over time, differentiation of the stroke S over time, and sum of the computed integration and differentiation to give unsprung mass vertical velocity dX/dt.

In box 104, the controller 30 computes integration of unsprung vertical velocity dX/dt over time to give the result as X, and sum of KX (=Fa) and CdX/dt (=Fd) to give combined force P.

In box 106, the controller 30 determines control gain α(alpha) in response to the result of power spectrum of the vertical body acceleration ZG. Specifically, the controller 30 computes the amplitute of peak level in the range of 0.6 to 5 Hz, weights the computed result, and sets the weighted result as Plow. Then, the controller 30 computes the amplitude of peak level in the range of 6 to 10 Hz, weights the computed results, and sets the weighted result as Phigh. The controller 30 compares Plow with Phigh and sets the control gain α(alpha) equal to a2 (=0.7) when Plow is greater than Phigh, and sets the control gain α(alpha) equal to a1 (=0.2) which Phigh is greater than Plow.

In bow 108, the controller 30 computes a product of α(alpha) and F to provide modified combined force F* and determines force UP*, which is expressed as –F*.

In box 110, the controller 30 computes force U*, which is expressed as U*=UN–K$_B$ZV+UP*.

In box 112, the controller 30 determines a hydraulic pressure value P at which the pressure chamber LP can cause the hydraulic actuator 18 to generate the force U*. The controller 30 then determines a currrent command value i for the determined hydraulic pressure value P and adjusts a current passing through the proportional type solenoid of the pressure regulator valve 20 to the current command value i, thus adjusting the pressure within the pressure chamber LP to the determined value P (see FIG. 3), causing the hydraulic actuator 18 to generate the determined force U*.

The above flow chart illustrates just one implementation of the first embodiment. The present invention is not limited to the use of power spectrum of ZG in determining the control gain α(alpha). One modification is to use two band-pass filters including a first band-pass filter having a single transmission band with a low cutoff frequency 0.5 Hz and a high cutoff frequency 5 Hz and a second band-pass filter having a single transmission band with a low cutoff frequency of 6 Hz and a high cutoff frequency of 10 Hz. The signals ZG are fed to these band-pass filters. The controller 30 computes integration of output of the first band-pass filter over a unit time, squares the integration result, weights the squared result and sets the weighted result as Jlow. Similarly, the controller 30 computes integration of output of the second band-pass filter over a unit time, squares the integration result, weights the squared result and sets the weighted result as Jhigh. The squared result for the second band-pass filter is more heavily weighted as compared to the squared result for the first band-pass filter, taking due consideration of human sensitivity and widened band weight of the second band-pass filter. The controller 30 compares Jlow and Jhigh and sets the control gain α(alpha) equal to a2 (=0.7) when Jlow is greater than Jhigh, and sets the control gain α(alpha) equal to a1 (=0.2) when Jhigh is greater than Jlow.

In the above description, the control gain α(alpha) takes one of the two distant values a1 and a2. The present invention is not limited to the use of such two distinct values a1 and a2 as the control gain α(alpha). One modification is to continuously vary the control gain α(alpha) between 1 (one) and 0 (zero). In this case, the control gain (alpha) can be expressed as follows:

$$\alpha = Plow/(Phigh+Plow) \quad (13).$$

The controller 30 computes the above equation (13) using the values Plow and Phigh to give the control gain α(alpha). According to the equation (13), the control gain α(alpha) approaches 1 (one) as the peak level of vibrations in the range of body resonance becomes predominant, while the control gain α(alpha) approaches 0 (zero) as the peak level of vibrations in the range of wheel carrier resonance becomes predominant.

In use of the values Jlow and Jhigh, the control gain α(alpha) can be expressed as:

$$\alpha = Jlow/(Jhigh+Jlow) \quad (14).$$

The controller 30 computes the above equation (14) to give the control gain α(alpha). According to this equation (14), the control gain α(alpha) approaches 1 (one) as the peak level of vibrations in the range of body resonance becomes predominant, while the control gain α(alpha) approaches 0 (zero) as the peak level of vibrations in the range of wheel carrier resonance becomes predominant.

In the above description, the control gain α(alpha) is varied in response to vibrations in the range of body resonance and vibrations in the range of wheel carrier resonance. Alternatively, the control gain α(alpha) may be varied in response to variation of absoulte value of signal ZG for vibrations in the range of one of body resonance and wheel carrier resonance.

In the suspension arrangement of FIG. 6, the signal S from the stroke sensor 27 is used in determining the unsprung mass vertical velocity dX/dt. If a vertical acceleration sensor is provided on the wheel carrier 14, the unsprung mass vertical velocity dX/dt can be determined as the integral of the output of the vertical acceleration sensor on the wheel carrier 14.

In the before mentioned equation (12), the modified combined force F* is given as the product αF.

If desired, the modified combined force F* may be obtained by filtering out frequencies above a cutoff frequency fc by means of a low-pass filter (LPF). For ease of explanation, this modified combined force F* is expressed as follows:

$$F^* = fc(F) \quad (15).$$

Gain vs. frequency plots F, G, and I are formed in FIG. 11 in addition to the two representative plots A and B. The plot F represents vibrations if cutoff frequency fc of the low-pass filter is 8.0 Hz, the plot G represents vibrations of cutoff frequency fc is 4.0 Hz, and the plot I vibrations if cutoff frequency I represents vibrations if cutoff frequency is 2.0 Hz.

As is readily seen from these plots F, G and I, insulation of the vehicle body 10 becomes worse for vibrations in the range of body resonance (1–3 Hz) as the cutoff frequency fc becomes lower, while insulation of the vehicle body 10 for vibrations in the range of wheel carrier resonance (above 5 or 6 Hz) becomes better. As the cutoff frequency fc becomes higher, insulation of the vehicle body 10 becomes better for vibrations in the range of body resonance, while insulation of the vehicle body 10 becomes worse for vibrations in the range of wheel carrier resonance.

Thus, the present invention proposes lowering or decreasing the cutoff- frequency fc of the low-pass filter when vibrations in the range of wheel carrier resonance become predominant. In this case, ill effect of vibrations in the range of body resonance is increased owing to lowered cutoff frequency. But, since vibrations in the range of body resonance are not predominant, vibrations of the vehicle body 10 can be held at a low level.

Also proposed is to lift or increase the cutoff frequency fc of the low-pass filter when vibrations in the range of body resonance become predominant. In this case, ill effect of vibrations in the range of wheel carrier resonance is increased owing to increased cutoff frequency. But, since the vibrations in the range of wheel carrier resonance are not predominant, vibrations of the vehicle body 10 can be held at a low level.

In the second embodiment of the present invention, the cutoff frequency fc takes two values of, for example, 8 Hz and 2 Hz. When vibrations in the range of body resonance are predominant, the cutoff frequency fc is set equal to 8 Hz, while when vibrations in the range of wheel carrier resonance are predominant, the cutoff frequency fc is set equal to 2 Hz.

Similarly to the first embodiment, the controller 30 computes Plow and Phigh and compares Plow with Phigh. The controller 30 sets the cutoff frequency fc equal to 8 Hz when Plow is greater than Phigh, and sets the cutoff frequency fc equal to 2 Hz.

The flow chart of FIG. 8 illustrates a control routine of a preferred implementation of the second embodiment according to the present invention. The controller 30 executes the control program illustrated in FIG. 8 at regular intervals Ts, for example, of a sampling time 20 ms.

The control program illustrated in FIG. 8 is substantially the same as the control program illustrated in FIG. 7 except the provision of two boxes 114 and 116 in the place of the boxes 106 and 108.

In box 114, the controller 30 determines cutoff frequency fc in response to the result of power spectrum of the vertical body acceleration ZG. Specifically, the controller 30 computes the amplitude of peak level in the range of 0.6 to 5 Hz, weights the computed result, and sets the weighted result as Plow. Then, the controller 30 computes the amplitude of peak level in the range of 6 to 10 Hz, weights the computed result, and sets the weighted result as Phigh. The controller 30 compares Plow with Phigh and sets the cutoff frequency fc equal to 8 Hz when Plow is greater than Phigh, and sets the cutoff frequency fc equal to 2 Hz when Phigh is greater than Plow.

In box 116, the controller 30 filters out frequencies of F above the cutoff frequency to provide modified combined force F* and determines force UP*, which is expressed as $-F^*$.

The above flow chart illustrates just one implementation of the second embodiment. The present invention is not limited to the use of power spectrum of ZG in determining the cutoff frequency fc. One modification is to use two band-pass filters including a first band-pass filter having a single transmission band with a low cutoff frequency 0.5 Hz and a high cutoff frequency 5 Hz and a second band-pass filter having a single transmission band with a low cutoff frequency of 6 Hz and a high cutoff frequency of 10 Hz. The signals ZG are fed to these band-pass filters. The controller 30 computes integration of output of the first band-pass filter over a unit time, squares the integration result, weights the squared result and sets the weighted result as Jlow. Similarly, the controller 30 computers integration of output of the second band-pass filter over a unit time, squares the integration result, weights the squared result and sets the weighted result as Jhigh. The squared result for the second band-pass filter is more heavily weighted as compared to the squared result for the first band-pass filter, taking due consideration of human sensitivity and widened band width of the second band-pass filter. The controller 30 compares Jlow with Jhigh and sets the cutoff frequency fc equal to 8 Hz when Jlow is greater than Jhigh, and sets the cutoff frequency fc equal to 2 Hz when Jhigh is greater than Jlow.

In the above description, the cutoff frequency fc takes one of the two distinct values 8 Hz and 2 Hz. The present invention is not limited to the use of such two distinct values 8 Hz and 2 Hz as the cutoff frequency. One modification is to continuously vary the cutoff frequency. In this case, the control gain can be expressed as follows:

$$fc=(2Phigh+8Plow)/(Phigh+Plow) \qquad (16)$$

The controller 30 computes the above equation (16) using the value Plow and Phigh to give the cutoff frequency fc. According to the equation (16), the cutoff frequency fc approaches 8 Hz as the peak level of vibrations in the range of body resonance becomes predominant, while the cutoff frequency fc approaches 2 Hz as the peak level of vibrations in the range of wheel carrier resonance becomes predominant.

In use of the values Jlow and Jhigh, the cutoff frequency fc can be expressed as:

$$fc=(2Jhigh+8Jlow)/(Jhigh+Jlow) \qquad (17)$$

The controller 30 computes the above equation (17) to give the cutoff frequency fc. According to this equation (17), the cutoff frequency fc approaches 8 Hz as the peak level of vibrations in the range of body resonance becomes predominant, while the cutoff frequency fc approaches 2 Hz as the peak level of vibrations in the range of wheel carrier resonance becomes predominant.

In the above description, the cutoff frequency fc is varied in response to vibrations in the range of body resonance and vibrations in the range of wheel carrier resonance. Alternatively, the cutoff frequency fc may be varied in response to variation of absolute value of signal ZG for vibrations in the range of one of body resonance and wheel carrier resonance.

In the equation (8), force UP is expressed as $UP=-F$. The combined force F is defined as the sum of the first force component Ps and the second force component Fd.

Gain vs. frequency plots J and K are formed in FIG. 14. The plot J represents vibrations if, in the equation (9), the force UP is given by $-Fd$, while the plot K represents vibrations if, in the equation (9), the force UP is given by $-Fs$.

As will be understood from the plot K, the force UP counterbalancing the first force component Fs generated by the spring 36 in response to road surface irregularities is required for insulation of the vehicle body 10 for vibrations in a low range of frequencies below 5 Hz. The plot J reveals that a reduction in the force UP counterbalancing the second force component Fd generated by the hydraulic actuator 18 in response to road surface irregularities is effective to eliminate ill effect for vibrations in a high range of frequencies.

Based on this recognition, the modified combined force F* is given by the following equation:

$$F^*=Fs+\alpha Fd \qquad (18)$$

where:

α(alpha) <1, for example, 0.50.

Combining the equation (18) with the equation (18) gives the following results:

$$UP^*=-(Fs+\alpha Fd) \qquad (19)$$

Gain vs. frequency plot L is formed in FIG. 15 is addition to the two representative plots A and B. The plot L represent vibrations if the control gain α(alpha) is 0.50.

The plot L reveals that insulation of the vehicle body 10 for vibration in the range of frequencies above 6 Hz is improved as compared to the plot A.

The flow chart of FIG. 12 illustrates a control routine of a preferred implementation of the third embodiment according to the present invention. The controller 30 executes the control program illustrated in FIG. 12 at regular intervals Ts, for example, of sampling time 20 ms.

The control program illustrated in FIG. 12 is substantially the same as the control program illustrated in FIG. 7 except the provision of boxes 118 and 120 in the place of the boxes 104, 106 and 108.

In box 118, the controller 30 computes the first force component Fs and the second force component Fd.

In box 120, the controller 30 computes a product of the second force component Fd and the control gain α(alpha), and then a sum of the product and the first force component Fs to provide modified combined force F*. Then, the controller 30 determines force UP*, which is expressed as −F*.

The control gain α(alpha) is less than 1 (one) and, for example, 0.50.

In this example, the control gain α(alpha) is fixed. The control gain α(alpha) may be varied.

Gain vs. frequency plots M and N are formed in FIG. 16 in addition to the plots B, L (see FIG. 15) and K (see FIG. 14). The plot B represents vibrations if the control gain α(alpha) is 1 (one), the plot M represents vibrations if the control gain α(alpha) is 0.75, the plot L represents vibrations if the control gain α(alpha) is 0.50, the plot N represents vibrations if the control gain α(alpha) is 0.25, and the plot K represents vibrations if the control gain α(alpha) is 0 (zero).

As is readily seen from the plots illustrated in FIG. 16, as the control gain α(alpha) becomes smaller from 1 (one) to 0 (zero), ill effect for vibrations in the range of frequencies 6 to 10 Hz, viz., in the range of wheel carrier resonance, becomes suppressed. But, insulation of the vehicle body 10 for vibrations in the range of frequencies 1 to 5 Hz, viz., in the range of body resonance, becomes worse. Comparing the plot K and the plot B (see FIG. 15) reveals that the level of insulation of the vehicle body 10 for vibration in the body resonance is satisfactory and ill effect for vibrations in the range of wheel carrier resonance is almost eliminated.

Thus, the control gain α(alpha) may take two values b1 and b2, in which b2 is not less than the value b1. These values b1 and b2 are not less than 0 (zero) and not greater than 1 (one). These values b1 and b2 are manually selected by an operator by, for example, turning a switch. The value b1 is, for example, 0.2, and the value b2 is, for example, 0.8. If desired, the control gain α(alpha) may alter continuously between 0 (zero) and 1 (one) in response to manipulation of a dial by a vehicle operator.

In the above description, the control gain α(signal) is fixed or variable in response to manipulation of the switch or dial by the vehicle operator. The third embodiment is not limited to the use of the fixed control gain nor manually selectable control gain.

One modification is to vary the control gain α(alpha) automatically. In this case, the controller 30 determines the control gain α(alpha) in response to the result of power specturm of the vertical velocity acceleration ZG in the same manner as described in connection the box 106 of the flow chart illustrated in FIG. 7. Specifically, the controller 30 computes the amplitude of peak level in the range of 1 to 5 Hz, viz., in the range of body resonance, weights the computed result, and sets the weighted result as Plow. Then, the controller 30 computes the amplitude of peak level in the range of 6 to 10 Hz, viz., in the range of the wheel carrier resonance, weights the computed result, and sets the weighted result as Phigh. The computed result for the range of 6 to 10 Hz is more heavily weighted as compared to the computed result for the range of 1 to 5 Hz, taking due consideration of human sensitivity. The controller 30 compares Plow with Phigh and sets the control gain α(alpha) equal to c2 when Plow is greater than Phigh, and sets the control gain α(alpha) equal to c1 when Phigh is greater than Plow. The value c2 is greater than the value c1, and the values c1 and c2 are not less than 0 (zero) and not greater than 1 (one).

According to this modification, the control gain α(alpha) is set equal to c2, for example, 1 (one), when Plow is greater than Phigh, that is, when vibrations in the range of body resonance are predominant, while the control gain α(alpha) is set equal to c1, for example, 0 (zero), when Phigh is greater than Plow, that is, when vibrations in the range of wheel carrier resonance are predominant.

The third embodiment according to the present invention is not limited to the use of power spectrum of ZG in determining the control gain α(alpha). Similarly to the modification of the first embodiment, one modification is to use two band-pass filters including a first band-pass filter having a single transmission band with a low cutoff frequency 1 Hz and a high cutoff frequency 5 Hz and a second band-pass filter having a single transmission band with a low cutoff frequency of 6 Hz and a high cutoff frequency of 10 Hz. The signals ZG are fed to these band-pass filters. The controller 30 computes integration of output of the first band-pass filter over a unit time, squares the integration result, weights the squared result, and sets the weighted result as Jlow. Similarly, the controller 30 computers integration of output of the second band-pass filter over a unit time, squares the integration result, weights the squared result, and sets the weighted result as Jhigh. The squared result for the second band-pass filter is more heavily weighted as compared to the squared result for the first band-pass filter, taking due consideration of human sensitivity and widened band width of the second band-ass filter. The controller 30 compares Jlow with Jhigh and sets the control gain α(alpha) equal to c2 (=1) when Jlow is greater than Jhigh, and sets the control gain α(alpha) equal to c1 (=0) when Jhigh is greater than Jlow.

In the above description of the modifications of the third embodiment, the control gain α(alpha) takes one of the two disinct values c1 and c2. Modifications of the third embodiment are not limited to the use of such two distinct values c1 and c2 as the control gain α(alpha). One further modification is to continuously vary the control gain α(alpha) between 1 (one) and 0 (zero). Using the values Plow and Phigh, the control gain α(alpha) can be expressed by the before mentioned equation (13).

The controller 30 computes the equation (13) using the values Plow and Phigh to give the control gain α(alpha). According to the equation (13), the control gain α(alpha) approaches 1 (one) as the peak level of vibrations in the range of body resonance becomes predominant, while the control gain α(alpha) approaches 0 (zero) as the peak level of vibrations in the range of wheel carrier resonance becomes predominant.

In the case of using the values Jlow and Jhigh, the control gain α(alpha) can be expressed by the before mentioned equation (14).

The controller 30 computes the equation (14) to give the control gain α(alpha). According to this equation (14), the control gain α(alpha) approaches 1 (one) as the peak level of vibrations in the range of body resonance becomes predominant, while the control gain α(alpha) approaches 0 (zero) as the peak level of vibrations in the range of wheel carrier resonance becomes predominant.

In the above description of the modifications of the third embodiment, the control gain α(alpha) is varied in response to vibrations in the range of body resonance and vibrations in the range of wheel carrier resonance. Alternatively, the control gain α(alpha) may be varied in resonse to variation of absolute value of signal ZG for vibrations in the range of one of body resonance and wheel carrier resonance.

Returning to FIG. 14, the plot J falls below the plot B in the range of frequencies above 2.2 Hz. This means that elimination of the first force component Fs in determining the counterbalancing force UP provides a better insulation of the vehicle body 10 for vibrations in the range of frequencies above 2.2 Hz than using the sum of the first and second force components Fs and Fd in determining the counterbalancing force UP.

Based on this recognition, the modified combined force F* is given by filtering out frequencies of the first force component Fs above a cutoff frequency fc by means of a low-pass filter (LPP). For ease of explanation, this modified combined force F* is expressed as follows:

$$F^* = fc(Fs) + Fd \tag{20}$$

A gain vs. frequency plot O is formed in FIG. 17 in addition to the two representative plots A and B. The plot O represents vibrations if the cutoff frequency is 4.0 Hz and filtering out frequencies above 4.0 Hz in calculating the equation (20) and then determining UP*, which is expressed by UP*=−F*.

Comparing the plot O with the plot B reveals that the peak of vibrations in the vicinity of 8 Hz is lowered, thus suppressing unpleasant vibrations in the range of 3 to 8 Hz.

The flow chart of FIG. 13 illustrates a control routine of a preferred implementation of the fourth embodiment according to the present invention. The controller 30 excutes the control program illustrated in FIG. 13 at regular intervals Ts, for example, of a sampling time 20 ms.

The control program illustrated in FIG. 13 is substantially the same as the control program illustrated in FIG. 12 except the provision of a box 122 in the place of the box 120.

In box 122, the controller 30 filters but frequencies of the first force compoenent Fs above the cutoff frequency fc, for example, 4.0 Hz, and then computes a sum of the first force component Fs after being filtered out and the second force component Fd to provide modified combined force F*. And then, the controller 30 determines force UP*, which is expressed as −F*.

In this example, the cutoff frequency fc is fixed. The cutoff frequency may alternatively be varied.

Gain vs. frequency plots P and Q are formed in FIG. 18 in addition to the two representation plots A and B. The plot P represents vibrations if frequencies of the first force component Fs are filtered out above the cutoff frequency fc of 7.0 Hz, and the plot Q represents vibrations if frequencies of the first component Fs are filtered out above the cutoff frequency of 3.0 Hz.

From these plots P and Q, it is appreciated that, when the cutoff frequency fc is high, viz., fc=7.0 Hz, good insulation of the vehicle body for vibrations in the range of frequencies 1 to 2 Hz is obtained, while, when the cutoff frequency fc is low, viz., fc=3.0 Hz, good insulation of the vehicle body 10 for vibrations in the range of frequencies 3–7 Hz is obtained.

Thus, according to one modification of the fourth embodiment, the cutoff frequency fc is varied according to varying vibration state of the vehicle body 10.

As the cutoff frequency fc becomes lower, insulation of the vehicle body 10 for vibrations with frequencies above 2.2 Hz becomes more effective, while insulation of the vehicle body 10 for vibrations with frequencies in the range of 1 to 2 Hz becomes less effective. As the cutoff frequency fc becomes higher and approaches 1 (one), insulation of the vehicle body 10 for vibrations with frequencies above 2.2 Hz becomes less effective, but insulation of the vehicle body for vibrations with frequencies in the range of 1 to 2 Hz becomes more effective.

Thus, the cutoff frequency fc may take two values of, for example, 3 Hz and 7 Hz. These values are manually selected by an operator by, for example, turning a switch. If desired, the cutoff frequency fc may alter continuously between 3 Hz and 7 Hz in response to manipulation of a dial by the operator.

In the above description of the fourth embodiment, the cutoff frequency fc is fixed or variable in response to manipulation of the switch or dial by the vehicle operator. The fourth embodiment is not limited to the use of the fixed cutoff frequency nor manually selectable cutoff frequency.

One modification is to vary the cutoff frequency fc automatically. In this case, the controller 30 determines the cutoff frequency fc in response to the result of power specturm of the vertical velocity acceleration ZG in the same manner as described in connection the box 106 of the flow chart illustrated in FIG. 7. Specifically, the controller 30 computes the amplitude of peak level in the range of 1 to 2 Hz, weights the computed result, and sets the weighted result as Plow. Then, the controller 30 computes the amplitude of peak level in the range of 3 to 7 Hz, weights the computed result, and sets the weighted result as Phigh. The computed result for the range of 3 to 7 Hz is more heavily weighted as compared to the computed result for the range of 1 to 2 Hz, taking due consideration of human sensitivity and due consideration of difference in width in the range. The controller 30 compares Plow with Phigh and sets the cutoff frequency fc equal to 7 Hz when Plow is greater than Phigh, and sets the cutoff frequency fc equal to 3 Hz when Phigh is greater than Plow.

The fourth embodiment according to the present invention is not limited to the use of power spectrum of ZG in determining the cutoff frequency fc. Similarly to the modification of the first embodiment, one modification is to use two band-pass filters including a first band-pass filter having a single transmission band with a low cutoff frequency 1 Hz and a high cutoff frequency 2 Hz and a second band-pass filter having a single transmission band with a low cutoff frequency of 3 Hz and a high cutoff frequency of 7 Hz. The signals ZG are fed to these band-pass filters. The controller 30 computes integration of output of the first band-pass filter over a unit time, squares the integration result, weights the squared result, and sets the weighted result as Jlow. Similarly, the controller 30 computers integration of output of the second band-pass filter over a unit time, squares the integration result, weights the squared result, and sets the weighted result as Jhigh. The squared result for the second band-pass filter is more heavily weighted as compared to the squared result for the first band-pass filter, taking due consideration of human sensitivity and widened band width of the second band-pass filter. The controller 30 compares Jlow with Jhigh and sets the cutoff frequency fc equal to 7 Hz when Jlow is greater than Jhigh, and sets the cutoff frequency fc equal to 3 Hz when Jhigh is greater than Jlow.

In the above description of the modifications of the fourth embodiment, the cutoff frequency takes one of the two distinct values. Modifications of the third embodiment are not limited to the use of such two distinct values as the cutoff frequency. One further modification is to continuously vary the cutoff frequency between 3 Hz and 7 Hz. Using the values Plow and Phigh, the cutoff frequency can be expressed as follows:

$$fc = (3Phigh + 7Plow)/(Phigh + Plow) \tag{21}$$

The controller 30 computes the equation (21) using the values Plow and Phigh to give the cutoff frequency fc. According to the equation (21), the cutoff frequency fc approaches 7 Hz as the peak level of vibrations in the frequency range 1–2 Hz becomes predominant, while the cutoff frequency fc approaches 3 Hz as the peak level of vibrations in the frequency range 3–7 Hz becomes predominant.

In the case of using the values Jlow and Jhigh, the cutoff frequency fc can be expressed as follows:

$$fc=(3Jhigh+7Jlow)/(Jhigh+Jlow) \quad (22).$$

The controller 30 computes the equation (22) to give the cutoff frequency fc. According to this equation (22), the cutoff frequency fc approaches 7 Hz as the peak level of vibrations in the frequency range 1-2 Hz becomes predominant, while the cutoff frequency fc approaches 3 Hz as the peak level of vibrations in the frequency range 3-7 Hz becomes predominant.

In the above description of the modifications of the fourth embodiment, the cutoff frequency is varied in response to vibrations in the frequency range 1-2 Hz and vibrations in the frequency range 3-7 Hz. Alternatively, the cutoff frequency fc may be varied in resonse to variation of absolute value of signal ZG for vibrations in one of the two frequency ranges.

In the third embodiment (see FIG. 12) and its modifications, the first force component Fs is unmodified and in the fourth embodiment (see FIG. 13) and its modifications, the second force component Fd is unmodified. If desired, the controls according to the third and fourth embodiments may be combined to provide the modified combined force F* as follows:

$$F^*=fc(Fs)+\alpha Fd \quad (23).$$

A gain vs. frequency plot R is formed in FIG. 19 in addition to the two representative plots A and B. The plot R represents vibrations if the cutoff frequency is 3.0 Hz and the control gain (alpha) is 0.75. It is appreciated from this plot R that, with satisfactory level of insulation of the vehicle body for vibrations in the range of body resonance, the vibration peak in the vicinity of 8 Hz is substantially lowered.

The previously described system may be extended to provide individual control of each corner of the vehicle body by the provision of a vertical acceleration sensor at each corner above the adjacent wheel and a stroke sensor between the adjacent wheel and the vehicle body. In this case, not only ride thresholds as described above, but also roll and pitch control with their own discrete threshold levels and frequency filtering can be provided. This can apply to roll and pitch movements induced by ride motion or those resulting from braking, acceleration or steering maneuvers. In the latter cases, suitable sensors are provided to sense movements therein and particularly the rate of change of movement.

Hereinafter, two implementations of such individual control are described.

Referring to FIG. 1, there is shown a wheel suspension arrangement 12 for an automotive vehile having a vehicle body 10 and four wheels, namely, a front left wheel 11FL, a front right wheel 11FR, a rear left wheel 11RL, and a rear right wheel 11RR. In the arrangement shown in FIG. 1, four wheel carriers 14 are employed for the front and rear wheels 11FL, 11FR, 11RL and 11RR, respectively. The wheel carriers 14 have hydraulic actuators 18FL, 18FR, 18RL, and 18RR associated with them, respectively, and suspension springs 36 associated with them, respectively. These hydraulic actuators and suspension springs are similar in design and function to that described in connection with FIG. 6. The wheel carriers 14 have pressure regulator valves 20FL, 20FR, 20RL, and 20RR associated with them, respectively. These pressure regulator valves are similar in design and function to that described in connection with FIG. 6. The wheel carriers 14 have stroke sensors 27FL, 27FR, 27RL, and 27RR associated with them, respectively, and vertical acceleration sensors 28FL, 28FR, 28RL, and 28RR associated with them, respectively. These stroke sensors and vertical acceleration sensors are similar in design and function to that described in connection with FIG. 6. Each of the vertical acceleration sensors 28FL, 28FR, 28RL, and 28RR is mounted on the vehicle body 10 above the associated one of the wheel carriers 14 to measure the vertical component of the body acceleration at that point.

Each of the hydraulic actuators 18FL, 18FR, 18RL, and 18RR includes a cylinder tube 18a and a piston 18c disposed in the cylinder tube 18a. Each piston is formed with an axial through bore, no numeral, and has a lower axial end face defining within the cylinder tube 18a a pressure chamber LP. Each hydraulic actuator can produce a body supporting force acting between the associated wheel carrier and the vehicle body 10. This force is determined by pressure within the pressure chamber LP and a difference in pressure acting area between the lower axial end face and an upper axial end face of the piston. Each of the cylinder tubes 18a is connected to the associated one of the wheel carriers 14 and a piston rod 18b associated with the cylinder tube 18a is connected to the vehicle body 10. The pressure chambers LP are connected via associated throttle valves 32 to associated accumulators 34, respectively. These accumulators 34 are provided for absorbing unsprung mass vibrations. The pressure chambers LP are connected, via pipes 38, to outlet ports of the associated pressure regulator valves 20FL, 20FR, 20RL, and 20RR, respectively. Each of the suspension springs 36 is arranged in a known manner between the associated cylinder tube 18a and the associated piston rod 18b to act between the vehicle body 10 and the associated wheel carrier 14.

Each of the pressure regulator valves 20FL, 20FR, 20RL, and 20RR is connected to an oil supply line 21S and also to an oil discharge or return line 21R. Through the supply line 21S, oil under pressure is fed from a source of oil pressure 22 to the pressure regulator valves 20FL, 20FR, 20RL, and 20RR, and oil discharge by these pressure regulator valves is allowed to return to the source of oil pressure 22 through the return line 21R. Each of the pressure regulator valves employed is known and disclosed in FIG. 2 of U.S. Pat. No. 4,938,499 issued to Kawabata on Jul. 3, 1990 which is hereby incorporated by reference in its entirety.

A front pressure accumulator 24F is connected to the supply line 21S adjacent the pressure regulator valves 20FL and 20FR for the front wheels 11FL and 11FR, while a rear pressure accumulator 24R is connected to the supply line 21S adjacent the pressure regulator valves 20RL and 20RR for the rear wheels 11RL and 11RR.

Sensor output S of each of the stroke sensors 27FL, 27FR, 27RL and 27RR and sensor output ZG of each of the vertical acceleration sensors 28FL, 28FR, 28RL, and 28RR are fed to a controller 30, which determines a current command value i for the associated one of the pressure regulator valves 20FL, 20FR, 20RL, and 20RR, thereby adjusting current passing through it in correspondance with the determined current command value i.

Figure 2:
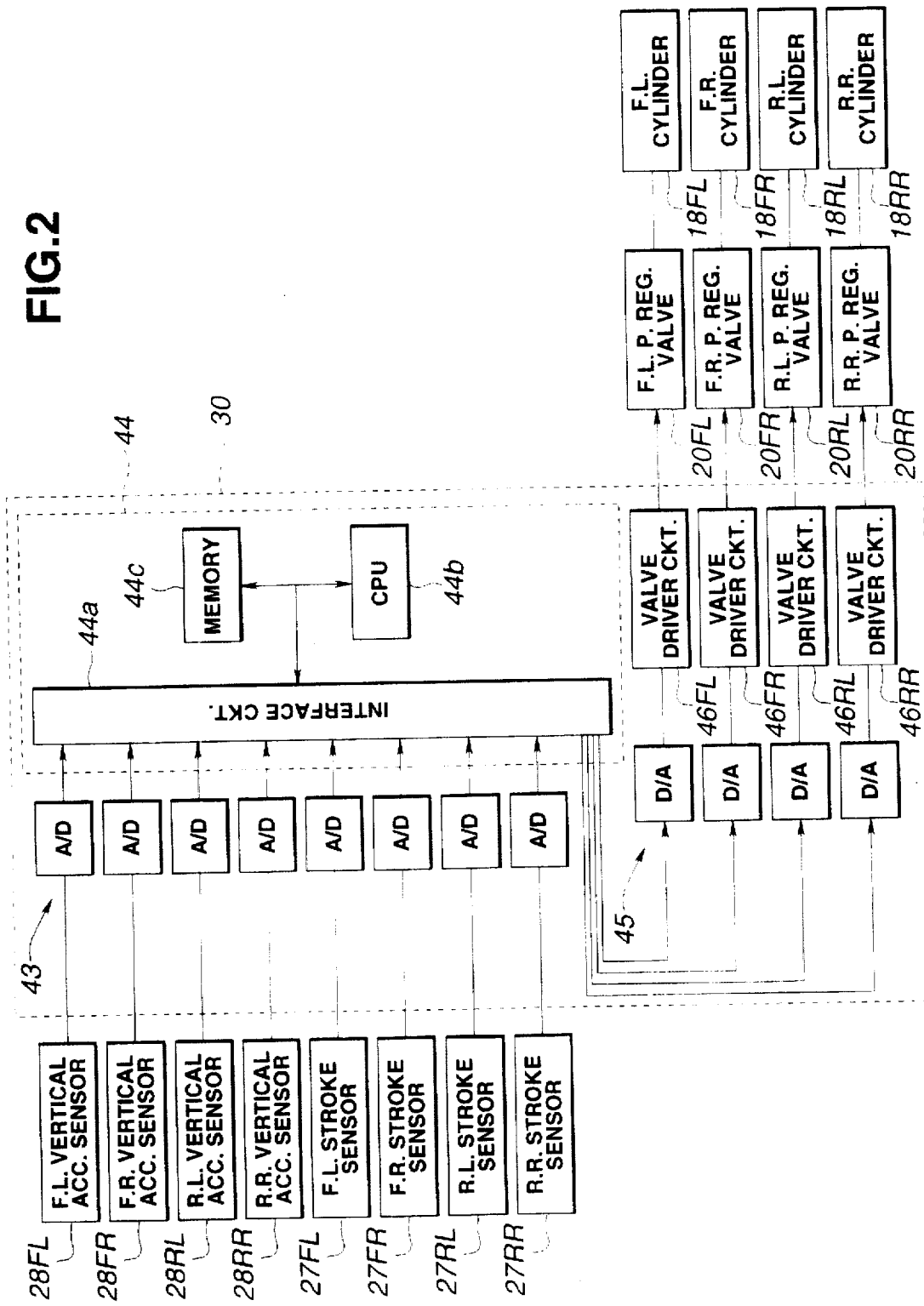
FIG. 2 is a black diagram of a control system for the suspension arrangement of FIG. 1.

As shown in FIG. 2, the controller 30 comprises analog to digital (A/D) converters 43 connected to the vertical acceleration sensors 28FL, 28FR, 28RL, and 28RR, and stroke sensors 27FL, 27FR, 27RL, and 27RR, respectively, and a microcomputer 44 including an input/output interface circuit 44a, a central processor unit (CPU) 44b, and a memory 44c. The memory 44c includes a random access memory (RAM), a read only memory (ROM) and registers. The controller 30 also comprises digital to analog (D/A) converters 45 which are connected to valve driver circuits 46FL, 46FR, 46RL, and 46RR, respectively, for the pressure regulator valves 20FL, 20FR, 20RL, and 20RR, respectively.

Sensor outputs $S_{FL}$, $S_{FR}$, $S_{RL}$, and $S_{RR}$ of the stroke sensors 27FL, 27FR, 27RL, and 27RR and sensor outputs $ZG_{FL}$, $ZG_{FR}$, $ZG_{RL}$, and $ZG_{RR}$ of the vertical acceleration sensors 28FL, 28FR, 28RL, and 28RR are converted into digital signals at the associated A/D converters 43. The digital outputs of the A/D converters 43 are fed to the input/output interface circuit 44a. The microcomputer 44 determines pressure command values $P_{FL}$, $P_{FR}$, $P_{RL}$, and $P_{RR}$, which are supplied via the input/output circuit 44a to the associated D/A converters 45 to be converted into analog signals. The analog outputs of the D/A converters 45 are converted at the associated valve driver circuits 46FL, 46FR, 46RL, and 46RR into current command values $i_{FL}$, $i_{FR}$, $i_{RL}$, and $i_{RR}$ for the associated pressure regulator valves 20FL, 20FR, 20RL, and 20RR, respectively.

The controller 30 is designed to execute initialization upon turning on the vehicle ignition switch.

In the multi-wheel suspension arrangement of FIG. 1, the control systems for the hydraulic actuators 18FL, 18FR, 18RL, and 18RR are independent so that the output $S_{FL}$ of the front left stroke sensor 27FL and the output $ZG_{FL}$ of the front left vertical acceleration sensor 28FL are taken into account in determining current command value $i_{FL}$ for the front left regulator valve 20FL, the output $S_{FR}$ of the front right stroke sensor 27FR and the output $ZG_{FR}$ of the front right vertical acceleration sensor 28FR are taken into account in determining current command value $i_{FR}$ for the front right pressure regulator valve 20FR, the output $S_{RL}$ of the rear left stroke sensor 27RL and the output $ZG_{RL}$ of the rear left vertical acceleration sensor 28RL are taken into account in determining current command value $i_{RL}$ for the rear left pressure regulator valve 20RL, and the output $S_{RR}$ of the rear right stroke sensor 27RR and the output $ZG_{RR}$ of the rear right vertical acceleration sensor 28RR are taken into account in determining current command value $i_{RR}$ for the rear right pressure regulator valve 20RR.

Specifically, the controller 30 executes, for each of the front and rear wheels suspension systems, a control program similar to that described in connection with each of the previously described embodiments and their modifications. For each wheel suspension system, the controller 30 determines the modified combined force $F^*$ after arithmetic operation based on information derived from sensor outputs S and ZG of the associated stroke sensor and vertical acceleration sensor. Then, the controller 30 determines force $UP^*$ by inverting $F^*$, see equation (10), and determines body supporting force $U^*$ by calculating the equation (11). The controller 30 determines a pressure command value P for the determined body supporting force $U^*$ for each of the front and rear wheel suspensions systems and converts at the associated valve driver circuit the pressure command value P into current command value i for the associated pressure regulator valve. Current passing through the solenoid of each of the pressure regulator valves is adjusted to the determined current command value i.

For the discussion hereinbelow, assume that, the controller 30 performs the similar control program to that described in connection with the first embodiment and illustrated by the flow chart of FIG. 7.

The controller 30 inputs information of stroke $S_{FL}$, $S_{FR}$, $S_{RL}$, and $S_{RR}$ from the stroke sensors 27FL, 27FR, 27RL, and 27RR, and information of vertical body acceleration $ZG_{FL}$, $ZG_{FR}$, $ZG_{RL}$, and $ZG_{RR}$ from the vertical acceleration sensors 28FL, 28FR, 28RL, and 28RR.

Then, the controller 30 determines unsprung mass vertical velocity $dX_{FL}/dt$, $dX_{FR}/dt$, $dX_{RL}/dt$, and $dX_{RR}/dt$ by calculating the following equations:

$$dX_{FL}/dt = dS_{FL}dt + \int ZG_{FL}dt \quad (24)$$

$$dX_{FR}/dt = dS_{FR}dt + \int ZG_{FR}dt \quad (25)$$

$$dX_{RL}/dt = dS_{RL}dt + \int ZG_{RL}dt \quad (26)$$

$$dX_{RR}/dt = dS_{RR}dt + \int ZG_{RR}dt \quad (27)$$

The controller 38 determines first and second force components $Fs_{FL}$ & $Fd_{FL}$, $Fs_{FR}$ & $Fd_{FR}$, $Fs_{RL}$ & $Fd_{RL}$, and $Fs_{RR}$ & $Fd_{RR}$ by calculating the following equations:

$$Fs_{FL} = K_{FL} \int (dX_{FL}/dt)dt \quad (28)$$

$$Fs_{FR} = K_{FR} \int (dX_{FR}/dt)dt \quad (29)$$

$$Fs_{RL} = K_{RL} \int (dX_{RL}/dt)dt \quad (30)$$

$$Fs_{RR} = K_{RR} \int (dX_{RR}/dt)dt \quad (31)$$

where: $K_{FL}$, $K_{FR}$, $K_{RL}$ & $K_{RR}$ are spring constants.

$$Fd_{FL} = C_{FL}(dX_{FL}/dt) \quad (32)$$

$$Fd_{FR} = C_{FR}(dX_{FR}/dt) \quad (33)$$

$$Fd_{RL} = C_{RL}(dX_{RL}/dt) \quad (34)$$

$$Fd_{RR} = C_{RR}(dX_{RR}/dt) \quad (35)$$

where: $C_{FL}$, $C_{FR}$, $C_{RL}$ & $C_{RR}$ are damping coefficients.

The controller 30 determines combined force $F_{FL}$, $F_{FR}$, $F_{RL}$ and $F_{RR}$ by calculating the following equations:

$$F_{FL} = Fs_{FL}Fd_{FL} \quad (36)$$

$$F_{FR} = Fs_{FR}Fd_{FR} \quad (37)$$

$$F_{RL} = Fs_{RL}Fd_{RL} \quad (38)$$

$$F_{RR} = Fs_{RR}Fd_{RR} \quad (39)$$

The controller 30 determines control gains $\alpha_{FL}$, $\alpha_{FR}$, $\alpha_{RL}$ and $\alpha_{RR}$ based on the power spectrums of $ZG_{FL}$, $ZG_{FR}$, $ZG_{RL}$, and $ZG_{RR}$ in the same manner as previously described in connection with the box 106 of the flow chart shown in FIG. 7.

Then, the controller 30 determines modified combined forces $F^*_{FL}$, $F^*_{FR}$, $F^*_{RL}$ and $F^*_{RR}$, which are expressed by the following equations:

$$F^*_{FL} = \alpha_{FL}F_{FL} \quad (40)$$

$$F^*_{FR} = \alpha_{FR}F_{FR} \quad (41)$$

$$F^*_{RL} = \alpha_{RL}F_{RL} \quad (42)$$

$$F^*_{RR} = \alpha_{RR}F_{RR} \quad (43)$$

The controller 30 determines forces $UP^*_{FL}$, $UP^*_{FR}$, $UP^*_{RL}$, and $UP^*_{RR}$ which are expressed by the following equations:

$$UP^*_{FL} = -F^*_{FL} \quad (44)$$

$$UP^*_{FR} = -F^*_{FR} \quad (45)$$

$$UP^*_{RL} = -F^*_{RL} \quad (46)$$

$$UP^*_{RR} = -F^*_{RR} \quad (47)$$

The controller 30 determines forces $U^*_{LF}$, $U^*_{LR}$, $U^*_{RL}$, and $U^*_{RR}$ by calculating the following equations:

$$U^*_{FL} = UN_F - K_B ZV_{FL} + UP^*_{FL} \tag{88}$$

$$U^*_{FR} = UN_F - K_B ZV_{FR} + UP^*_{FR} \tag{89}$$

$$U^*_{RL} = UN_R - K_B ZV_{RL} + UP^*_{RL} \tag{50}$$

$$U^*_{RR} = UN_R - K_B ZV_{RR} + UP^*_{RR} \tag{51}$$

where: $UN_F$ and $UN_R$ are forces required to hold the vehicle body 10 as high as a target level of height;

$K_B$ is the bounce coeffeicient;

$ZV_{FL}$ is the integral of $ZG_{FL}$ over time;

$ZV_{FR}$ is the integral of $ZG_{FR}$ over time;

$ZV_{RL}$ is the integral of $ZG_{RL}$ over time;

$ZV_{RR}$ is the integral of $ZG_{RR}$ over time.

Then, the controller 30 determines pressure command values $P_{FL}$, $P_{FR}$, $P_{RL}$, and $P_{RR}$ for the hydraulic actuators 18FL, 18FR, 18RL and 18RR, respectively, for causing them to generate body supporting forces $U^*_{FL}$, $U^*_{FR}$, $U^*_{RL}$, and $U^*_{RR}$, respectively.

The microcomputer 40 of the controller 30 outputs these pressure command values $P_{FL}$, $P_{FR}$, $P_{RL}$, and $P_{RR}$ via the input/output interface circuit 44a.

These outputs are fed via the associated D/A converters 45 to the associated valve driver circuits 46FL, 46FR, 46RL, and 46RR for the associated pressure regulator valves 20FL, 20FR, 20RL, and 20RR.

The valve driver circuits 46FL, 46FR, 46RL, and 46RR produce current command values $i_{FL}$, $i_{FR}$, $i_{RL}$, and $i_{RR}$ corresponding to the pressure command values $P_{FL}$, $P_{FR}$, $P_{RL}$, and $P_{RR}$, respectively, and adjust electric current passing through the solenoids of the pressure regulator valves 20FL, 20FR, 20RL, and 20RR, accordingly.

The integration of the signal from each of the vertical acceleration sensors and the differentiation of the signal from each of the stroke sensors are done mathematically as part of the control system program. The integration and differentiation can be done electronically by providing an integrator unit and a differential unit.

Control of movement of the vehicle body 10 is considered. Assuming that the vehicle is travelling at a constant speed on smooth and flat road surface, the following relations hold:

$$Fs_{FL} = 0 \tag{52}$$

$$Fs_{FR} = 0 \tag{53}$$

$$Fs_{RL} = 0 \tag{54}$$

$$Fs_{RR} = 0 \tag{55}$$

$$Fd_{FL} = 0 \tag{56}$$

$$Fd_{FR} = 0 \tag{57}$$

$$Fd_{RL} = 0 \tag{58}$$

$$Fd_{RR} = 0 \tag{59}$$

$$UP^*_{FL} = 0 \tag{60}$$

$$UP^*_{FR} = 0 \tag{61}$$

$$UP^*_{RL} = 0 \tag{62}$$

$$UP^*_{RR} = 0 \tag{63}$$

$$ZV_{FL} = 0 \tag{64}$$

$$ZV_{FR} = 0 \tag{65}$$

$$ZV_{RL} = 0 \tag{66}$$

$$ZV_{RR} = 0 \tag{67}$$

The body supporting forces at the respective wheel suspension systems are:

$$U^*_{FL} = UN_F \tag{68}$$

$$U^*_{FR} = UN_F \tag{69}$$

$$U^*_{RL} = UN_R \tag{70}$$

$$U^*_{RR} = UN_R \tag{71}$$

Thus, the vehicle body 10 is held as high as the target level of height.

Assuming that the front wheels 11FL and 11FR bump so that the cylinder tubes 18a of the front position hydraulic actuators 18FL and 18FR are lifted relative to the associated pistons 18c, the output signals $S_{FL}$ and $S_{FR}$ of the stroke sensors 27FL and 27FR change from 0 (zero) to positive signals since the front position stroke sensors 27FL and 27FR sense minus stroke or compression of the associated actuators 18FL and 18FR. For simplification of explanation, let us also assume that the output signals $S_{RL}$ and $S_{RR}$ of the rear position stroke sensors 27RL and 27RR remain substantially 0 (zero). The output signals $ZG_{FL}$ and $ZG_{FR}$ of the front position vertical acceleration sensors 28FL and 28FR change from 0 (zero) to positive signals, and the output signals $ZG_{RL}$ and $ZG_{RR}$ of the rear position vertical acceleration sensors 28RL and 28RR remain substantially 0 (zero).

Neglecting the change in $ZG_{RL}$ and $ZG_{RR}$, the following relations hold:

$$Fs_{FL} > 0 \tag{72}$$

$$Fs_{FR} > 0 \tag{73}$$

$$Fd_{FL} > 0 \tag{74}$$

$$Fd_{FR} > 0 \tag{75}$$

$$Fs_{RL} = 0 \tag{76}$$

$$Fs_{RR} = 0 \tag{77}$$

$$Fd_{RL} = 0 \tag{78}$$

$$Fd_{RR} = 0 \tag{79}$$

$$UP^*_{FL} < 0 \tag{80}$$

$$UP^*_{FR} < 0 \tag{81}$$

$$UP^*_{RL} = 0 \tag{82}$$

$$UP^*_{RR} = 0 \tag{83}$$

$$ZV_{FL} > 0 \tag{84}$$

$$ZV_{FR} > 0 \tag{85}$$

$$ZV_{RL} = 0 \tag{86}$$

$$ZV_{RR} = 0 \tag{87}$$

Thus, the body supporting forces at the respective wheel suspension systems are:

$$U^*_{FL} = UN_F - K_B ZV_{FL} + UP^*_{FL} \tag{88}$$

$$U^*_{FR} = UN_F - K_B ZV_{FR} + UP^*_{FR} \tag{89}$$

$$U^*_{RL} = UN_F \tag{90}$$

$$U^*_{RR}=UN_F \qquad (91)$$

From the above equations (88), (89), (90) and (91), it is seen that the body supporting forces $U^*_{FL}$ and $U^*_{FR}$ at the front wheels decrease, while the body supporting forces $U^*_{RL}$ and $U^*_{RR}$ at the rear wheels are unchanged. As the vertical components of vehicle body velocity $ZV_{FL}$ and $ZV_{FR}$ at the front wheels change, the body supporting forces $U^*_{FL}$ and $U^*_{FR}$ change accordingly, holding the vehicle body 10 as high as the target level of height.

Another implementation of individual control is described below in connection with FIGS. 20, 21 and 22.

The wheel suspension arrangement of FIG. 20 and the control system of FIG. 22 are substantially the same as that of FIG. 1 and that of FIG. 2, respectively.

A major difference lies in that unsprung mass vertical velocity data $dX_{FL}/dt$ and $dX_{FR}/dt$ for the front wheels are stored in delay means and the stored data are used as vertical velocity data $dX_{RL}/dt$ and $dX_{RR}/dt$ for the rear wheels. The delay means can vary delay time in response to a vehicle speed indicative signal V from a vehicle speed sensor 50. The advantage lies in the elimination of two rear position stroke sensors. Besides, this data processing is effective particularly when the vehicle travels generally straight. The delay means include a program controlled shift register region defined in a memory 44c of a microcomputer 44 of a controller 30.

Referring to FIG. 20, the suspension arrangements different from that of FIG. 1 in that the two rear position stroke sensors 27RL and 27RR are not employed and the vehicle speed sensor 50 feeds the vehicle speed indicative signal V to the controller 30. In the control system of FIG. 22, the vehicle speed indicative signal V is fed via an A/D converter 43 to an input/output interface 44a, and the microcomputer 44 stores unsprung mass vertical velocity data $dX_{FL}/dt$ and $dX_{FR}/dt$ for the front wheels 11FL and 11FR into the shift register region in the memory 44c together with a delay time (tau), and moves each of the previously stored data in the shift register area after decreasing the accompanying delay time by a sampling time Ts, for example, of 20 ms, and uses the stored data whose accompanying delay time have become zero in determining forces $UP_{RL}$ and $UP_{RR}$ for the rear wheels 11RL and 11RR.

The delay time (tau) is expressed as:

$$\tau=(L/V)-\tau s \qquad (92)$$

where: $\tau$(tau) is the delay time;

L is the distance between the axes of the front and rear wheels on one side of the vehicle;

V is the vehicle speed; and $\tau s$ is the control system delay including the hydraulic delay and the arithmetic operation delay.

Upon moving each of the stored data and the accompanying stored delay time $\tau$(tau) in the shift register area, each stored delay time $\tau$(tau) is updated after decrement by the sampling time Ts, which is corrected by a correction factor $\Delta\tau$(delta tau). The correction factor $\Delta\tau$(delta tau) can be expressed as:

$$\Delta\tau=L/\Delta V \qquad (93)$$

where: $\Delta V$ is the deviation of a current measure of vehicle speed from the last measure of vehicle speed Ts ago falling outside of a window including 0 (zero).

Using such correction factor, the correction is effected such that the decrement amount by which the delay time $\tau$(tau) varies with variations in vehicle speed.

The flow chart of FIG. 21 illustrates a control routine of a preferred implementation of the control system mentioned above. The controller 30 executes the control program illustrated in FIG. 21 at regular intervals Ts of the sampling time of 20 ms.

At input box 130, the controller 30 inputs information of stroke $S_{FL}$ and $S_{FR}$ from the front position stroke sensors 27FL and 27FR, information of vertical body acceleration $ZG_{FL}$, $ZG_{FR}$, $ZG_{RL}$, and $ZG_{RR}$ not only from the front position vertical acceleration sensors $28_{FL}$ and $28_{FR}$, but also from the rear position vertical acceleration sensors $28_{RL}$ and $28_{RR}$. The controller 30 inputs information of vehicle speed V from the vehicle speed sensor 50, too.

In box 132, the controller 30 determines unsprung mass vertical velocity $dX_{FL}/dt$ and $dX_{FR}/dt$ for the front wheels by calculating the equations (24) and (25).

In box 134, the controller 38 determines first and second force components $Fs_{FL}$ & $Fd_{FL}$ and $Fs_{FR}$ & $Fd_{FR}$ by calculating the equations (28), (29), (32) and (33).

In box 136, the controller determines modified combined force $F^*_{FL}$ and $F^*_{FR}$ for the front wheels and force $UP^*_{FL}$ and $UP^*_{FR}$ for the front wheels by inverting the associated combined force $F^*_{FL}$ and $F^*_{FR}$, respectively.

In box 138, the controller 30 determines the delay time (tau) in response to the current vehicle speed data V by calculating the equation (92).

In box 140, the controller 30 determines the correction factor $\Delta\tau$(delta tau) by calculating the equation (93).

In box 142, the controller 30 stores a set of current or new data $dX_{FL}/dt$, $dX_{FR}/dt$ and $\tau$(tau) in a memory location of the shift register region after decreasing each of the accompanying delay time data $\tau$(tau) of all of the previously stored or old data sets in different memory locations of the shift register region and moving all of the previously data sets to the adjacent memory locations of the shift register region.

In box 144, the controller 30 fetches one of the stored data sets whose accompanying delay time has become 0 (zero) out of a memory location of the shift register region as $(dX_{FL}/dt)$ old and $(dX_{FR}/dt)$ old, and clears the memory location.

In box 148, the controller 30 determines first and second force components $Fs_{RL}$ & $Fd_{RL}$ and $Fs_{RR}$ & $Fd_{RR}$ by calculating the equations (30), (31), (34) and (35) after substituting $dX_{RL}/dt$ and $dX_{RR}/dt$ with $(dX_{FL}/dt)$ old and $(dX_{FR}/dt)$ old, respectively.

In box 148, the controller 30 determines unmodified combined force $F_{RL}$ for the rear left wheel as the sum of $Fs_{RL}$ and $Fd_{RL}$ and unmodified combined force $F_{RR}$ for the rear right wheel as the sum of $Fs_{RR}$ and $Fd_{RR}$, and determines force $UP_{RL}$ and $UP_{RR}$ after inverting $F_{RL}$ and $F_{RR}$, respectively.

In box 150, using the data obtained in boxes 136 and 148, the controller 30 determines $U^*_{LF}$ and $U^*_{LR}$ by calculating the equations (48) and (49), and determines $U_{RL}$ and $U_{RR}$ by calculating the following equations:

$$U_{RL}=UN_R-K_BZV_{RL}+UP_{RL} \qquad (94)$$

$$U_{RR}=UN_R-K_BZV_{RR}+UP_{RR} \qquad (95)$$

In a box 152, the controller 30 determines pressure command values $P_{FL}$, $P_{FR}$, $P_{RL}$, and $P_{RR}$ for the hydraulic actuators 18FL, 18FR, 18RL and 18RR, respectively, for causing them to generate body supporting forces $U^*_{FL}$, $U^*_{FR}$, $U_{RL}$, and $U_{RR}$, respectively, and outputs them via the input/output interface circuit 44a.

These outputs are fed via the associated D/A converters 45 to the associated valve driver circuits 46FL, 46FR, 46RL, and 46RR for the associated pressure regulator valves 20FL, 20FR, 20RL, and 20RR.

The valve driver circuits 46FL, 46FR, 46RL, and 46RR produce current command values $i_{FL}$, $i_{FR}$, $i_{RL}$, and $i_{RR}$ corresponding to the pressure command values $P_{FL}$, $P_{FR}$, $P_{RL}$, and $P_{RR}$, respectively, and adjust electric current passing through the solenoids of the pressure regulator valves 20FL, 20FR, 20RL, and 20RR, accordingly.

What is claimed is:

1. A wheel suspension arrangement for a vehicle having a vehicle body, comprising:

a wheel carrier movably mounted on the vehicle body;

a suspension spring acting between said wheel carrier and the vehicle body;

an actuator operable in response to a control signal to produce a body supporting force acting between the body and the wheel carrier; and a controller operable to develop the control signal, the controller being operable to derive a combined force acting on the body by the suspension spring and by the actuator in response to the vertical component of vibrations of the wheel carrier, the controller being operable to modify the derived combined force and also operable to determine a force counterbalancing the modified derived combined force, the controller being operable to vary the control signal such that the body supporting force varies by the determined counterbalancing force, the derived combined force being modified in such a manner as to insulate transmission of vibrations to the body in the range of body resonance as well as transmission of vibrations to the body in the range of wheel carrier resonance.

2. A wheel suspension arrangement as claimed in claim 1, wherein the controller is operable to modify the derived combined force by calculating a product of the derived combined force and a control gain, and the controller is operable to decrease the control gain when vibrations of the body in the range of wheel carrier resonance become predominant.

3. A wheel suspension arrangement as claimed in claim 1, wherein the controller is operable to modify the derived combined force by calculating a product of the derived combined force and a control gain, and the controller is operable to increase the control gain when vibrations of the body in the range of body resonance become predominant.

4. A wheel suspension arrangement as claimed in claim 1, wherein the controller is operable to modify the derived combined force by filtering out frequencies of the derived combined force above cutoff frequency, and the controller is operable to lower the cutoff frequency when vibrations of the body in the range of wheel carrier resonance become predominant.

5. A wheel suspension arrangement as claimed in claim 1, wherein the controller is operable to modify the derived combined force by filtering out frequencies of the derived combined force above cutoff frequency, and the controller is operable to increase the cutoff frequency when vibrations of the body in the range of body resonance become predominant.

6. A wheel suspension arrangement as claimed in claim 1, further comprising a stroke sensor arranged to produce a first sensor signal corresponding to the position of the wheel carrier relative to the body, and an acceleration sensor arranged to produce a second sensor signal corresponding to the vertical component of acceleration of the body adjacent the wheel, and the controller is operable to derive the vertical component of velocity of the wheel carrier from said first and second sensor signals and to derive the combined force out of the derived vertical component of velocity of the wheel carrier.

7. A wheel suspension arrangement as claimed in claim 1, wherein the controller is operable to derive a first force component acting on the body by the suspension spring and a second force component acting on the body by the actuator in response to the vertical component of vibrations of the wheel carrier and to give a sum of the derived first and second force components as the derived combined force.

8. A wheel suspension arrangement as claimed in claim 7, wherein the controller is operable to modify the derived combined force by calculating a product of the derived second force component and a control gain that is less than one.

9. A wheel suspension arrangement as claimed in claim 7, wherein the controller is operable to modify the derived combined force by filtering out frequencies of the derived first force component above cutoff frequency.

10. A wheel suspension arrangement as claimed in claim 1, wherein the controller is operable to derive the vertical component of velocity of the wheel carrier, the controller is operable to derive a first force component applied to the body by the suspension spring and a second force component applied to the body by the actuator out of the derived vertical component of velocity of the wheel carrier, the controller is operable to give a sum of the derived first and second force components as the derived combined force, and the controller is operable to modify the derived combined force by calculating a product of the derived second force component and a control gain that is less than one and by filtering out frequencies of the derived first force component above cutoff frequency.

11. A wheel suspension arrangement as claimed in claim 8, wherein the controller is operable to adjust the control gain in accordance with the state of vibrations of the body.

12. A wheel suspension arrangement as claimed in claim 10, wherein the controller is operable to adjust the control gain in accordance with the state of vibrations of the body.

13. A wheel suspension arrangement as claimed in claim 9, wherein the controller is operable to adjust the cutoff frequency in accordance with the state of vibrations of the body.

14. A wheel suspension arrangement as claimed in claim 10, wherein the controller is operable to adjust the cutoff frequency in accordance with the state of vibrations of the body.

15. A wheel suspension arrangement as claimed in claim 6, wherein there are a plurality of the wheel carriers, a plurality of the suspension springs, a plurality of the actuators, and a plurality of stroke and vertical acceleration sensors associated respectively with the wheel carriers, wherein the wheel carriers are for front and rear wheels on both sides of the body, and wherein the controller for the actuators receives signals from all of the stroke and vertical acceleration sensors so as to be sensitive to relatively different motions of the wheel carriers.

16. A wheel suspension arrangement as claimed in claim 6, wherein there are a plurality of the wheel carriers for front and rear wheels on the same side of the vehicle body, a plurality of the suspension springs, a plurality of the actuators, and a plurality of the vertical acceleration sensors associated respectively with the wheel carriers for the front and rear wheels, and wherein the stroke sensor is associated with the wheel carrier for the front wheel.

17. A wheel suspension arrangement as claimed in claim 16, wherein the controller for the actuators receives signals from the stroke sensor and the signals from all of the vertical acceleration sensors so as to be senstitive to relatively different motions of the wheel carriers.

18. A wheel suspension arrangement as claimed in claim 17, wherein the controller includes delay means for storing data determined based on signals from the stroke sensor and the vertical acceleration sensor for the front wheel for a delay time, and the controller receives the data stored in the delay means and the signal from the vertical acceleration sensor for the rear wheel so as to be sensitive to motion of the wheel carrier for the rear wheel.

19. A wheel suspension arrangement as claimed in claim 18, wherein there is a vehicle speed sensor, and wherein the controller is operable to vary the delay time in response to signal from the vehicle speed sensor.

20. A wheel suspension arrangement as claimed in claim 19, wherein the controller includes a shift register.

21. A wheel suspension arrangement as claimed in claim 20, wherein the controller stores new data and the accompanying delay time in a memory location in the shift register region after updating the previously stored delay times accompanying the previously stored data, respectively, and moving said previously stored data and the associated updated delay times to the adjacent memeory locations, respectively.

22. A wheel suspension arrangement as claimed in claim 21, wherein the controller uses one of the stored data in the shift register region after the associated acccompanying delay time has become zero to control the actuator associated with the rear wheel.

* * * * *